(12) United States Patent
Witte et al.

(10) Patent No.: US 9,738,375 B2
(45) Date of Patent: Aug. 22, 2017

(54) ONE-PIECE COMPOSITE BIFURCATED WINGLET

(71) Applicant: The Boeing Company, Chicago, IL (US)

(72) Inventors: Philipp Witte, Seattle, WA (US); Stanley Warren Stawski, Camano Island, WA (US); Fedor A. Kleshchev, Seattle, WA (US); Joshua William Zarfos, Renton, WA (US); Parth R. Naidu, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 590 days.

(21) Appl. No.: 14/097,413

(22) Filed: Dec. 5, 2013

(65) Prior Publication Data

US 2016/0009379 A1 Jan. 14, 2016

(51) Int. Cl.
*B64C 23/06* (2006.01)
*B29C 70/44* (2006.01)
(Continued)

(52) U.S. Cl.
CPC .......... *B64C 23/065* (2013.01); *B29C 70/345* (2013.01); *B29C 70/44* (2013.01);
(Continued)

(58) Field of Classification Search
CPC B64C 23/065; B64C 5/06; B64C 5/08; B29C 70/44; B29C 70/345; B32B 5/02; B32B 27/08
See application file for complete search history.

(56) References Cited

U.S. PATENT DOCUMENTS 2,576,981 A * 12/1951 Vogt .......................... B64C 5/08
 244/130
4,674,709 A * 6/1987 Welles .................. B64C 23/065
 244/199.4

(Continued)

FOREIGN PATENT DOCUMENTS

EP 1585664 B1 12/2010
GB 2475523 5/2011
(Continued)

OTHER PUBLICATIONS

Chris Brady, "Advanced Blended/Advanced Technology Winglets" in the 737 Technical Site, http://www.b737.org.uk/winglets.htm#ATWinglets. Archived on Jul. 29, 2012 by Internet Archive, https://web.archive.org/web/20120729032554/http://www.b737.org.uk/winglets.htm, accessed May 9, 2016.*
(Continued)

*Primary Examiner* — Tien Dinh
*Assistant Examiner* — Alexander V Giczy
(74) *Attorney, Agent, or Firm* — Yee & Associates, P.C.

(57) ABSTRACT

A method and apparatus for forming a winglet formed as a one-piece composite for an aircraft is presented. The winglet comprises a first blade, a second blade, and a root region. The first blade includes a first leading edge and a first trailing edge. The second blade includes a second leading edge and a second trailing edge. The second blade is positioned at an angle to the first blade. The root region is co-cured with the first blade and the second blade to form the winglet. The root region is configured to receive an attachment system for attaching the winglet to a wing of the aircraft.

20 Claims, 29 Drawing Sheets

(51) Int. Cl.
B64C 5/08 (2006.01)
B64D 45/02 (2006.01)
B29C 70/34 (2006.01)
B32B 5/02 (2006.01)
B32B 27/08 (2006.01)
B64F 5/00 (2017.01)
B29K 105/08 (2006.01)
B29K 307/04 (2006.01)
B29L 31/30 (2006.01)

(52) U.S. Cl.
CPC .............. B32B 5/02 (2013.01); B32B 27/08 (2013.01); B64C 5/08 (2013.01); B64D 45/02 (2013.01); B64F 5/0009 (2013.01); B29K 2105/0872 (2013.01); B29K 2307/04 (2013.01); B29L 2031/3085 (2013.01); B32B 2262/106 (2013.01); B32B 2605/18 (2013.01); Y02T 50/164 (2013.01); Y02T 50/433 (2013.01)

(56) References Cited

U.S. PATENT DOCUMENTS

| 5,348,253 | A | | 9/1994 | Gratzer | |
|---|---|---|---|---|---|
| 5,407,153 | A | * | 4/1995 | Kirk | B64C 23/065 244/199.4 |
| 6,743,504 | B1 | * | 6/2004 | Allen | B29C 70/446 428/188 |
| 2003/0106961 | A1 | | 6/2003 | Wyrembek et al. | |
| 2007/0018049 | A1 | * | 1/2007 | Stuhr | B64C 23/065 244/124 |
| 2009/0084904 | A1 | * | 4/2009 | Detert | B64C 23/065 244/199.4 |
| 2009/0148655 | A1 | * | 6/2009 | Nies | B29C 70/865 428/99 |
| 2009/0283639 | A1 | * | 11/2009 | Ackermann | B64C 3/18 244/131 |
| 2011/0159764 | A1 | * | 6/2011 | Price | B32B 15/08 442/228 |
| 2012/0027594 | A1 | * | 2/2012 | Lewke | F03D 1/0608 416/146 R |
| 2012/0049010 | A1 | | 3/2012 | Speer | |
| 2012/0112005 | A1 | * | 5/2012 | Chaussee | B64C 23/065 244/123.1 |
| 2012/0312928 | A1 | * | 12/2012 | Gratzer | B64C 23/065 244/199.4 |
| 2013/0092797 | A1 | * | 4/2013 | Wright | B64C 23/065 244/199.4 |

FOREIGN PATENT DOCUMENTS

SE WO 2014081380 A1 * 5/2014 .............. B64C 3/28
WO WO2012171023 A1 12/2012

OTHER PUBLICATIONS

FAA, AC_AMJ 20-TBD Aircraft Lightning Zoning, Final Draft Dec. 2, 1998; http://www.faa.gov/regulations_policies/rulemaking/committees/documents/media/TAEeehT2-121192.pdf, accessed May 10, 2016.*
Ed Rupke, Lightning Direct Effects Handbook, Mar. 1, 2002; http://www.niar.wichita.edu/agate/documents/lightning/wp3.1-031027-043.pdf, accessed May 10, 2016.*
Randy Tinseth, "Spread your wings" in Randy's Journal, posted May 3, 2015. http://www.boeingblogs.com/randy/archives/2012/05/spread_your_wings.html, accessed May 9, 2016.*
Clayton J. Bargsten, Winglets: Striving for Wingtip Efficiency, in Clayton J. Bargsten and Malcolm T. Gibson, NASA Innovation in Aeronautics: Select Technologies That Have Shaped Modern Aviation, NASA/TM-2011-216987, Aug. 2011.*
Canadian Intellectual Property Office Examination Search Report, dated Nov. 2, 2015, regarding Application No. 2,862,394, 5 pages.
Extended EP search report, dated Apr. 24, 2015, regarding application 14191460.6, 8 pages.

* cited by examiner

ONE-PIECE COMPOSITE BIFURCATED WINGLET

BACKGROUND INFORMATION

1. Field

The present disclosure relates generally to an aircraft and, in particular, to composite structures for the aircraft. Still more particularly, the present disclosure relates to a method and apparatus for a one-piece composite bifurcated winglet for the aircraft.

2. Background

Aircraft are being designed and manufactured with greater and greater percentages of composite materials. Composite materials are used in aircraft to decrease the weight of the aircraft. This decreased weight improves performance characteristics such as payload capacities and fuel efficiencies. Further, composite materials provide longer service life for various components in an aircraft.

Composite materials are tough, lightweight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

In manufacturing composite structures, layers of composite material are typically laid up on a tool. The layers may be comprised of fibers in sheets. These sheets may take the form of fabrics, tape, tows, or other suitable forms. In some cases, resin may be pre-impregnated into the sheets. These types of sheets are commonly referred to as prepreg.

The different layers of prepreg may be laid up in different orientations and different numbers of layers may be used depending on the thickness of the composite structure being manufactured. These layers may be laid up by hand or by using automated lamination equipment such as a tape laminating machine or a fiber placement system.

After the different layers of composite material have been laid up on the tool, the layers of composite material may be consolidated and cured upon exposure to temperature and pressure, thus forming the final composite structure. Thereafter, the composite structure may be inspected to determine whether inconsistencies are present, and, if no inconsistencies are identified, the composite structure may be put in service.

Composite materials are used for winglets on an aircraft. The use of composite materials in winglets may reduce the weight of the aircraft as compared to using metal materials for the winglets.

In this illustrative example, a "winglet" refers to an angled extension of a wingtip of the aircraft. The angle, shape, and size of a winglet are unique to the application of the aircraft. Some winglets may be bifurcated winglets. In this illustrative example, a "bifurcated winglet" is a winglet that has two blades arranged at an angle relative to one another.

In some cases, however, winglets may be more complicated and costly to manufacture than desired. Moreover, as the complexity of composite winglets increases, the assembly and maintenance time for an aircraft also increases. Therefore, it would be desirable to have a method and apparatus that take into account at least some of the issues discussed above, as well as other possible issues.

SUMMARY

In one illustrative embodiment, a composite winglet for an aircraft comprises a first blade, a second blade, and a root region. The first blade includes a first leading edge and a first trailing edge. The second blade includes a second leading edge and a second trailing edge. The second blade is positioned at an angle to the first blade. The root region is co-cured with the first blade and the second blade to form the composite winglet. The root region is configured to receive an attachment system for attaching the composite winglet to a wing of the aircraft.

In another illustrative embodiment, a tool for forming a composite winglet comprises a first part, a second part, and a third part. The first part includes an upper portion with a first cavity and a lower portion with a second cavity. The lower portion is arranged at an angle to the upper portion and connected to the upper portion at a transition region. The second part is configured to be placed over the first cavity of the upper portion. The third part is configured to be placed over the second cavity of the lower portion. The first part, the second part, and the third part are configured to receive a number of plies of composite material to form a composite winglet for an aircraft.

In yet another illustrative embodiment, a method for forming a composite winglet for an aircraft is provided. A number of plies of composite material are laid up on a tool. The tool comprises a first part, a second part, and a third part. The first part includes an upper portion with a first cavity and a lower portion with a second cavity. The lower portion is positioned at an angle to the upper portion and connected to the upper portion at a transition region. The second part is configured to be placed over the first cavity of the upper portion. The third part is configured to be placed over the second cavity of the lower portion. A group of spacers is positioned within the first cavity and the second cavity of the tool. The spacers are configured to form a number of chambers within the composite winglet. The second part is placed over the first cavity and the third part over the second cavity. The number of plies of composite material are cured to form the composite winglet for an aircraft as a single part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to provide a winglet for an aircraft that generates a desired level of fuel efficiency for the aircraft. The illustrative embodiments recognize and take into account that winglets may be beneficial for aircraft for a number of different reasons. For example, winglets may convert some of the energy wasted in the wingtip vortex to thrust, reduce drag and vortex interference with airflow near the wingtips, and increase the overall performance of the aircraft during flight.

The illustrative embodiments recognize and take into account, however, that some winglets for aircraft are manufactured in a number of parts including composite blades with metal fasteners, support ribs, and caps, among other components. These parts are then assembled to form a winglet for the aircraft. With this type of winglet, the cost to manufacture and assemble the parts may be more than desired.

The illustrative embodiments also recognize and take into account that with a winglet with a number of assembled parts, the performance of the winglet may be reduced at the interfaces between parts. For example, the structural integrity at the interface of a fastener and a composite blade may be less than desired. As a result, more layers of composite material may be needed to compensate for reduced strength. Consequently, a desired level of aerodynamic performance, cost savings, or manufacturing efficiency may not be realized.

Thus, the illustrative embodiments provide a method, apparatus, and tool for forming a composite winglet for an aircraft. The composite winglet comprises a first blade, a second blade, and a root region. The first blade includes a first leading edge and a first trailing edge. The second blade includes a second leading edge and a second trailing edge. The second blade is positioned at an angle to the first blade. The root region is co-cured with the first blade and the second blade to form the composite winglet. The root region is configured to receive an attachment system for attaching the composite winglet to a wing of the aircraft.

Figure 1:
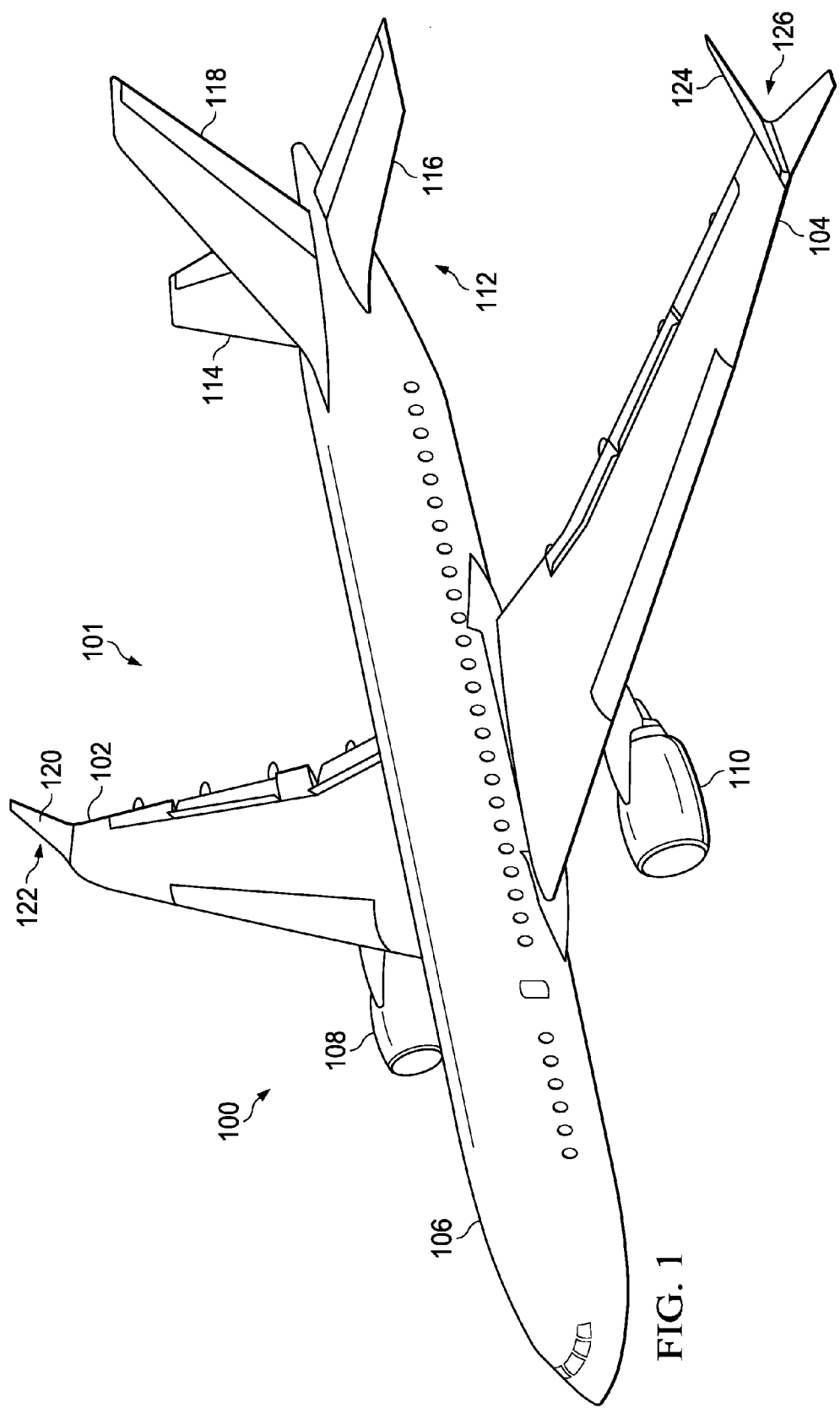
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this illustrative example, aircraft 100 has number of airfoil structures 101.

As used herein, a "number of" items may be one or more items. For example, a number of airfoil structures means one or more airfoil structures.

In this illustrative example, number of airfoil structures 101 may include various types of airfoil structures. For example, without limitation, airfoil structures in number of airfoil structures 101 may be selected from at least one of a wingtip, a winglet, a wing, a horizontal stabilizer, a vertical stabilizer, an airbrake, a control surface, a rudder, a flap, a spoiler, an aileron, or a slat.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As illustrated, number of airfoil structures 101 includes wing 102, wing 104, horizontal stabilizer 114, horizontal stabilizer 116, vertical stabilizer 118, and other suitable airfoil structures. In this illustrative example, wing 102 and wing 104 are attached to body 106. Engine 108 is attached to wing 102 and engine 110 is attached to wing 104. Body 106 has tail section 112. Horizontal stabilizer 114, horizontal stabilizer 116, and vertical stabilizer 118 are attached to body 106.

In this depicted example, wing 102 includes winglet 120. Winglet 120 may have number of blades 122. When winglet 120 has more than one blade, those blades may be arranged at an angle with respect to one another.

In this illustrative example, winglet 120 is a bifurcated winglet. As depicted, a bifurcated winglet has two blades arranged at an angle relative to each other. Winglet 120 is attached to the tip of wing 102 in these illustrative examples.

In a similar fashion, wing 104 includes winglet 124. Winglet 124 may include number of blades 126 arranged at an angle relative to one another. In this illustrative example, winglet 124 also is a bifurcated winglet. Winglet 124 is attached to the tip of wing 104 in these illustrative examples.

Aircraft 100 is an example of an aircraft in which a one-piece bifurcated composite winglet may be implemented in accordance with an illustrative embodiment. In this illustrative example, the one-piece bifurcated composite winglet may be attached to a wing of aircraft 100 during manufacturing of aircraft 100, retro-fitted for use on aircraft 100, or added to aircraft 100 during various stages of the service life of aircraft 100.

The illustration of aircraft 100 in FIG. 1 is not meant to imply physical or architectural limitations to the manner in which an illustrative configuration may be implemented. For example, although aircraft 100 is shown as a commercial aircraft, aircraft 100 also may be a military aircraft, a rotorcraft, a helicopter, an unmanned aerial vehicle, or any other suitable aircraft that may employ winglets.

Figure 2:
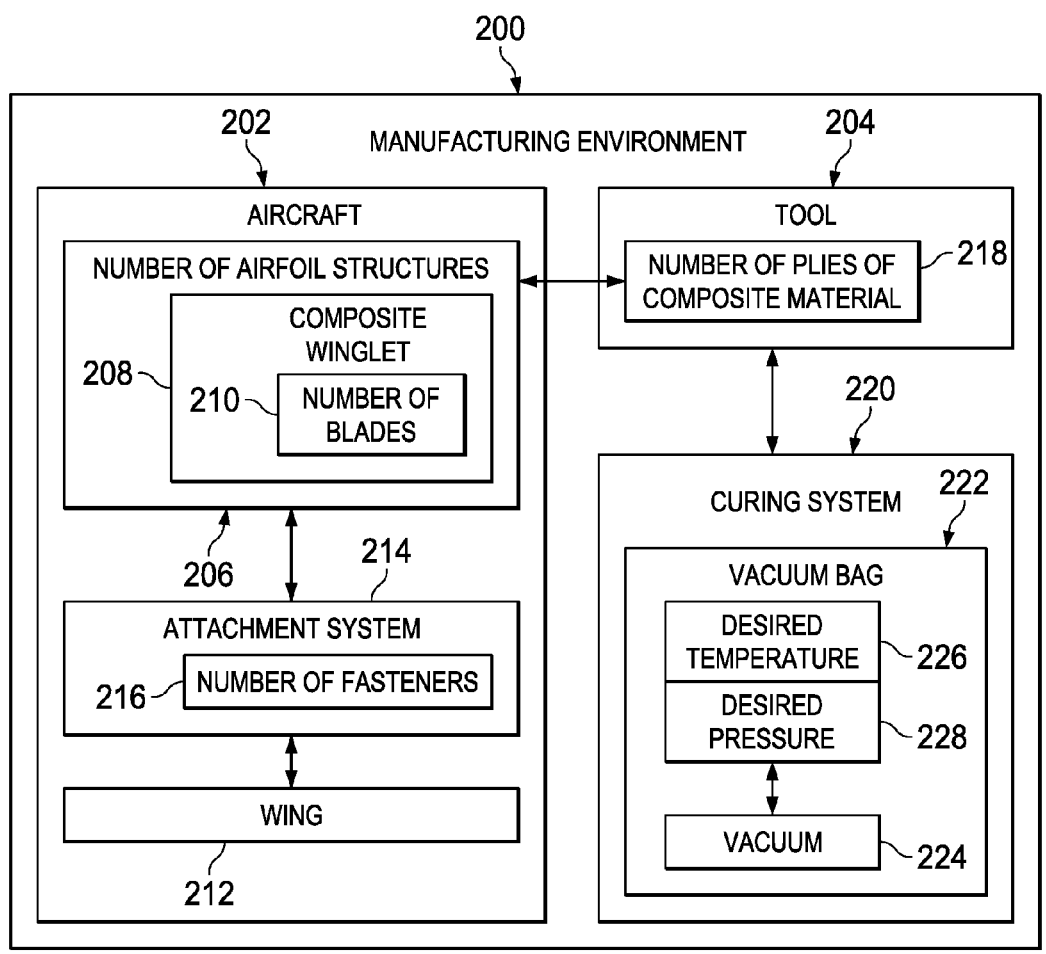
FIG. 2 is an illustration of a block diagram of an aircraft manufacturing environment in accordance with an illustrative embodiment.

With reference next to FIG. 2, an illustration of a block diagram of an aircraft manufacturing environment is depicted in accordance with an illustrative embodiment. In this depicted example, aircraft manufacturing environment 200 includes aircraft 202 and tool 204. Aircraft 100 in FIG. 1 is an example of one implementation for aircraft 202 shown in this figure.

As illustrated, aircraft 202 comprises number of airfoil structures 206. Number of airfoil structures 101 in FIG. 1 is an example of one implementation for number of airfoil structures 206 shown in this figure.

An airfoil structure in number of airfoil structures 206 may take various forms. For example, without limitation, one of number of airfoil structures 206 may be selected from at least one of a wingtip, a wing, a horizontal stabilizer, a vertical stabilizer, an airbrake, a control surface, a rudder, a flap, a spoiler, an aileron, a slat, or other suitable types of airfoil structures.

In this illustrative example, number of airfoil structures 206 includes composite winglet 208. Composite winglet 208 is an angled extension of a wingtip of aircraft 202. In the illustrative example, composite winglet 208 is a structure comprised of composite materials cured to form composite winglet 208. The angle, shape, and size of composite winglet 208 are unique to the application of aircraft 202. Winglet 120 and winglet 124 in FIG. 1 may be examples of implementations for composite winglet 208 shown in block form in this figure.

In this illustrative example, composite winglet 208 comprises number of blades 210. Composite winglet 208 is a bifurcated winglet and comprises two blades arranged at an angle relative to one another in this illustrative example.

In other illustrative examples, composite winglet 208 may have more or fewer blades, depending on the particular implementation. For example, number of blades 210 in composite winglet 208 may include one blade, three blades, five blades, or another suitable number of blades, depending on the particular implementation.

Composite winglet 208 may be comprised of a number of different types of material. For example, without limitation, composite winglet 208 may be comprised of a carbon fiber reinforced polymer, fiberglass, aramid fiber, nylon, and other suitable types of materials.

In this illustrative example, composite winglet 208 is associated with wing 212 of aircraft 202. As used herein, when one component is "associated" with another component, the association is a physical association in the depicted examples. For example, a first component, such as composite winglet 208, may be considered to be associated with a second component, such as wing 212, by at least one of being secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by at least one of being formed as part of or as an extension of the second component.

As illustrated, composite winglet 208 is attached to wing 212 of aircraft 202 using attachment system 214. Attachment system 214 may be configured to be placed inside of composite winglet 208 and attached to wing 212 of aircraft 202 using number of fasteners 216. In other illustrative examples, attachment system 214 may be secured to composite winglet 208 using at least one of an adhesive, a weld, a bond, or some other suitable attachment mechanism.

As depicted, number of fasteners 216 may include various types of fasteners. For example, number of fasteners 216 may include screws, clips, bolts, hinges, welds, flanges, anchors, rivets, pins, and other suitable types of fasteners.

Number of fasteners 216 is configured to attach composite winglet 208 to wing 212 to provide a desired level of aerodynamic performance and a desired level of structural stability. This desired level of aerodynamic performance, desired level of structural stability, or both may be selected based on the type of aircraft selected for aircraft 202, the parameters of operation of aircraft 202, or a combination thereof.

As an example, larger aircraft with greater wingspans may use more fasteners or stronger fasteners to offset higher speeds and wing loads. Moreover, these larger aircraft may have larger dimensions for composite winglet 208 than smaller aircraft. Conversely, composite winglet 208 for smaller aircraft configured to carry lighter loads and have shorter wingspans may have fewer of number of fasteners 216 attaching composite winglet 208 to wing 212 as compared to larger aircraft.

In this illustrative example, composite winglet 208 is manufactured using tool 204. In particular, number of plies of composite material 218 is laid up on tool 204 to form composite winglet 208.

In this illustrative example, a "ply" is a layer of fibrous composite material and may have resin infused within the layer. When resin is infused within the layer, the ply may be referred to as prepreg.

In some illustrative examples, the ply does not have resin infused within it. In this case, resin may be infused within the material prior to or during curing, using commonly known impregnation methods. In the instance case, one of number of plies of composite material 218 may be selected from at least one of fabric, cloth, tape, tows, or other suitable configurations of composite material.

As depicted, curing system 220 is configured to cure number of plies of composite material 218 on tool 204 to form composite winglet 208. In this illustrative example, vacuum bag 222 is placed around tool 204 with number of plies of composite material 218.

Vacuum 224 is then applied to tool 204 with number of plies of composite material 218 and cured using desired temperature 226 and desired pressure 228. After a period of time, composite winglet 208 may then be removed from tool 204 and attached to wing 212 of aircraft 202 in these illustrative examples.

Figure 3:
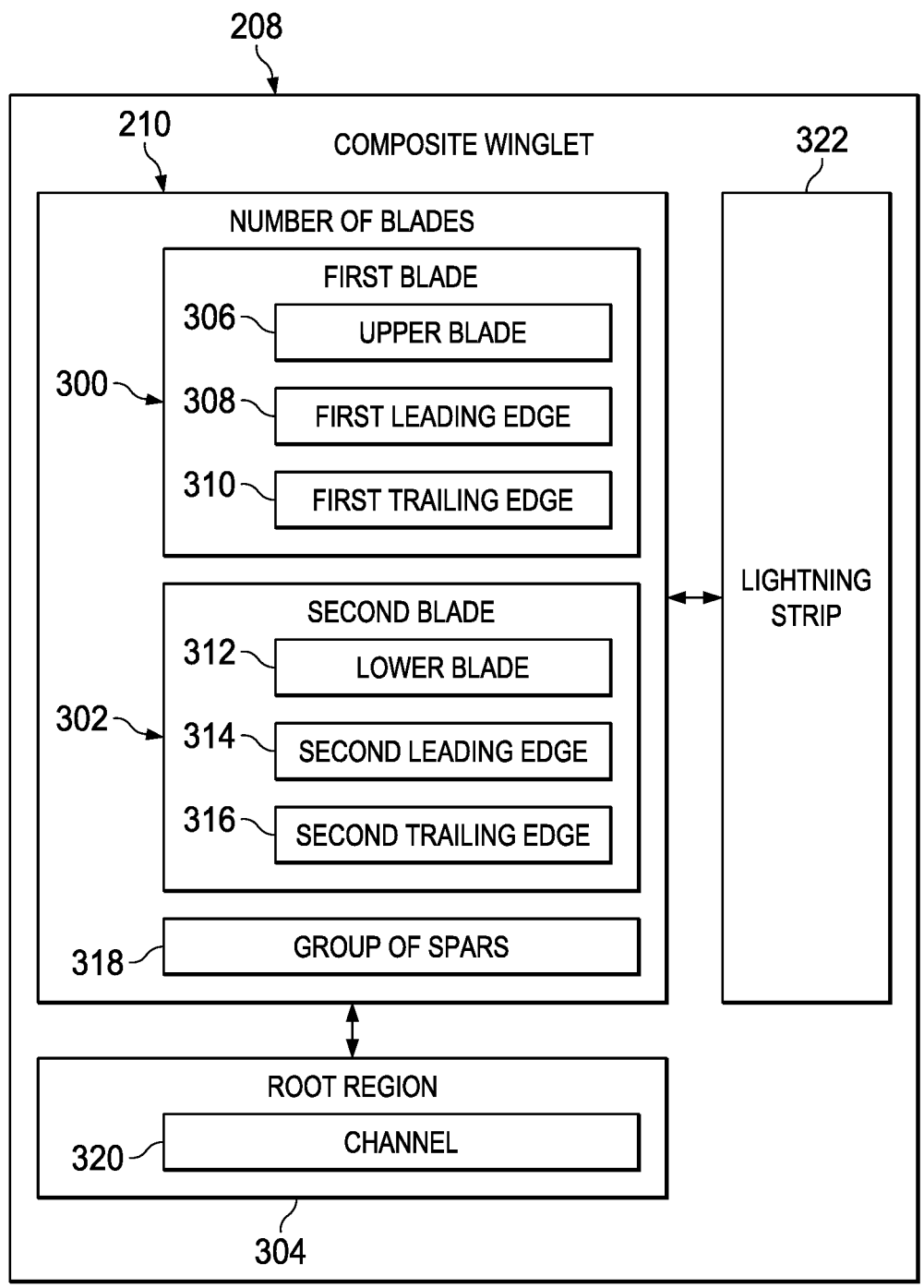
FIG. 3 is an illustration of a block diagram of a composite winglet in accordance with an illustrative embodiment.

Turning next to FIG. 3, an illustration of a block diagram of a composite winglet is depicted in accordance with an illustrative embodiment. In this illustrative example, a more-detailed illustration of composite winglet 208 with number of blades 210 from FIG. 2 is shown.

As illustrated, composite winglet 208 comprises first blade 300, second blade 302, and root region 304. First blade 300 may be upper blade 306 and includes first leading edge 308 and first trailing edge 310 in this illustrative example.

In this depicted example, first leading edge 308 is the portion of first blade 300 of composite winglet 208 that first contacts the air when aircraft 202 is in operation. In other words, first leading edge 308 of first blade 300 is the foremost edge of first blade 300. First trailing edge 310 of first blade 300 of composite winglet 208 is the rearmost edge of first blade 300, where airflow separated by first leading edge 308 rejoins.

As depicted, second blade 302 of composite winglet 208 includes second leading edge 314, and second trailing edge 316. Second blade 302 may take the form of lower blade 312 in this illustrative example.

Second leading edge 314 of second blade 302 is the foremost edge of second blade 302, while second trailing edge 316 is the rearmost edge of second blade 302. Second blade 302 is positioned at an angle relative to first blade 300 in this depicted example.

In this illustrative example, first blade 300 and second blade 302 may have a similar shape and similar dimensions. In one example, the dimensions of first blade 300 and second blade 302 may be substantially the same. In other illustrative examples, however, first blade 300 may have a different shape, dimensions, or both than second blade 302. For instance, first blade 300 may be longer than second blade 302.

As illustrated, group of spars 318 is associated with number of blades 210. For example, group of spars 318 may be positioned within number of blades 210. In one example, one of number of spars 318 is positioned within each of number of blades 210. In other illustrative examples, more than one of number of spars 318 may be positioned within each of number of blades 210, depending on the particular implementation.

In this depicted example, root region 304 is co-cured with first blade 300 and second blade 302. In particular, root region 304 connects first blade 300 with second blade 302.

In this illustrative example, "co-curing" refers to the act of curing one uncured composite part to another composite part or to a core material at substantially the same time. The core material may be selected from one of balsa, honeycomb, or foam core. When co-curing parts, all adhesives and resins are cured during the same process.

As depicted, root region 304 comprises channel 320. Channel 320 may be configured to receive attachment system 214 in FIG. 2. For instance, root region 304 may receive attachment system 214 in channel 320 of root region 304 and may be secured to attachment system 214 using number of fasteners 216 in FIG. 2.

In this depicted example, first blade 300, second blade 302, or both first blade 300 and second blade 302 may be associated with lightning strip 322. Lightning strip 322 is a lightning diverting device configured to protect composite winglet 208 from damage caused by an electromagnetic event, such as a lightning strike. In particular, lightning strip 322 is configured to dissipate electricity from an electromagnetic event.

As depicted, at least one of first trailing edge 310 of first blade 300 or second trailing edge 316 of second blade 302 is associated with lightning strip 322. Lightning strip 322 may extend along the entire surface of first trailing edge 310 or second trailing edge 316.

In some illustrative examples, lightning strip 322 is co-cured with composite winglet 208 when composite winglet 208 is cured. In particular, lightning strip 322 is co-cured with first blade 300, second blade 302, and root region 304 of composite winglet 208. In other illustrative examples, lightning strip 322 may be connected to composite winglet 208 in some other suitable manner.

Figure 4:
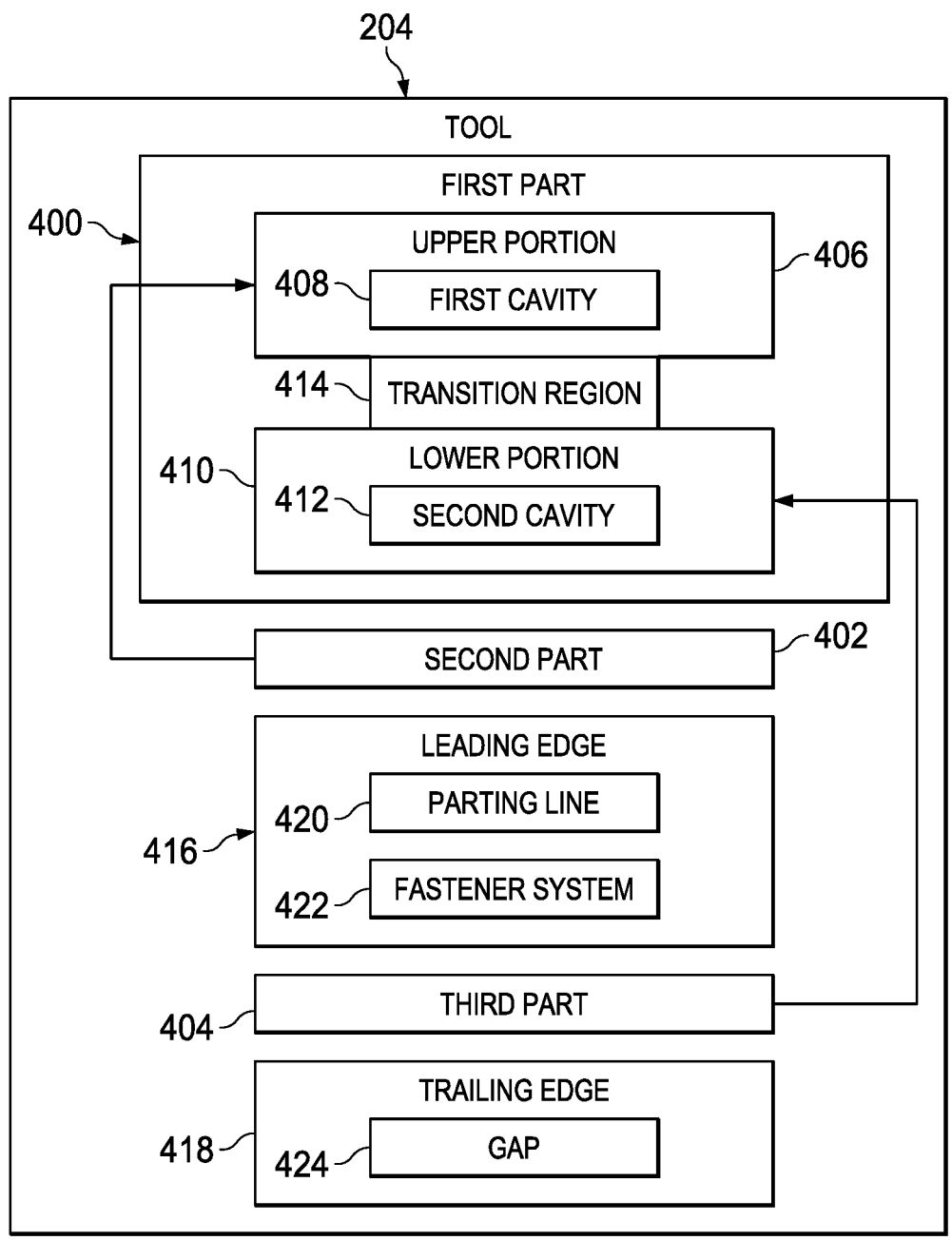
FIG. 4 is an illustration of a block diagram of a tool for forming a composite winglet in accordance with an illustrative embodiment.

In FIG. 4, an illustration of a block diagram of a tool for forming a composite winglet is depicted in accordance with an illustrative embodiment. In this depicted example, a more-detailed illustration of tool 204 from FIG. 2 is shown.

As illustrated, tool 204 includes first part 400, second part 402, and third part 404. First part 400, second part 402, and third part 404 are configured to receive number of plies of composite material 218 to form composite winglet 208 for aircraft 202 shown in block form in FIG. 2 in this illustrative example.

In this depicted example, first part 400 includes upper portion 406 with first cavity 408 and lower portion 410 with second cavity 412. Upper portion 406 is associated with lower portion 410 in this illustrative example. In particular, upper portion 406 and lower portion 410 are welded together to form first part 400. Lower portion 410 is connected to upper portion 406 at transition region 414.

As depicted, lower portion 410 is arranged at an angle to upper portion 406. The angle may be selected based on a desired level of aerodynamic performance for composite winglet 208.

As illustrated, first part 400 of tool 204 is configured to form an outboard skin of composite winglet 208. In other words, number of plies of composite material 218 is positioned in first part 400 of tool 204 to form the outboard skin of composite winglet 208 once cured.

A number of plies of composite material are laid up on the upper portion 406 of first part 400 to form the outboard skin of upper blade 306 of composite winglet 208 from FIG. 3, while lower portion 410 of first part 400 is configured to form the outboard skin of lower blade 312 of composite winglet 208 from FIG. 3. In this illustrative example, an "outboard skin" is the skin of composite winglet 208 that faces outwardly away from the body of the aircraft.

In this illustrative example, a number of plies of composite material are laid up on the transition region 414 to form part of root region 304 in FIG. 3. Transition region 414 forms the outboard portion of root region 304 in this illustrative example.

As illustrated, second part 402 is configured to be placed over first cavity 408 of upper portion 406 of first part 400 of tool 204. In a similar fashion, third part 404 is configured to be placed over second cavity 412 of lower portion 410 of first part 400 of tool 204.

A number of plies of composite material may be laid up on second part 402 to form an inboard skin of first blade 300, and third part 404 may form an inboard skin of second blade 302 in this illustrative example. In this illustrative example, an "inboard skin" is the skin of composite winglet 208 that faces inwardly toward the body of the aircraft.

In this depicted example, tool 204 may be comprised of a number of different types of material. For instance, tool 204 may be comprised of one or more materials selected from at least one of a metal, a metal alloy, wood, foam, steel, poly(methyl methacrylate), aluminum, nickel, an aluminum-nickel alloy, or some other suitable material.

In some illustrative examples, tool 204 may be comprised of a material with a coefficient of thermal expansion that is similar to that of the material selected for number of plies of composite material 218. Moreover, depending on the curing conditions and the heat and pressure applied to tool 204, various materials may be selected to form an illustrative embodiment in a desired manner. Tool 204 may be fabricated using well-known tool fabrication techniques.

As depicted, tool 204 comprises leading edge 416 and trailing edge 418 opposite leading edge 416. In this illustrative example, leading edge 416 of tool 204 corresponds to first leading edge 308 of first blade 300 and second leading edge 314 of second blade 302 of composite winglet 208 in FIG. 3. In a similar fashion, trailing edge 418 of tool 204 corresponds to first trailing edge 310 of first blade 300 and second trailing edge 316 of second blade 302 of composite winglet 208 in FIG. 3.

Parting line 420 is arranged along leading edge 416 of tool 204 in this illustrative example. Parting line 420 is the portion of tool 204 where second part 402 and third part 404 may be attached to first part 400 of tool 204.

At least one of second part 402 or third part 404 may be attached to upper portion 406 and lower portion 410 of first part 400, respectively, using fastener system 422 in this illustrative example. Fastener system 422 may include at least one of nuts, bolts, screws, clips, anchors, adhesive, or other suitable types of fasteners.

As illustrated, tool 204 also comprises gap 424 in trailing edge 418 of tool 204. Gap 424 is configured to form a thin trailing edge for composite winglet 208. A number of additional gaps also may be present in tool 204 in other illustrative examples.

Figure 5:
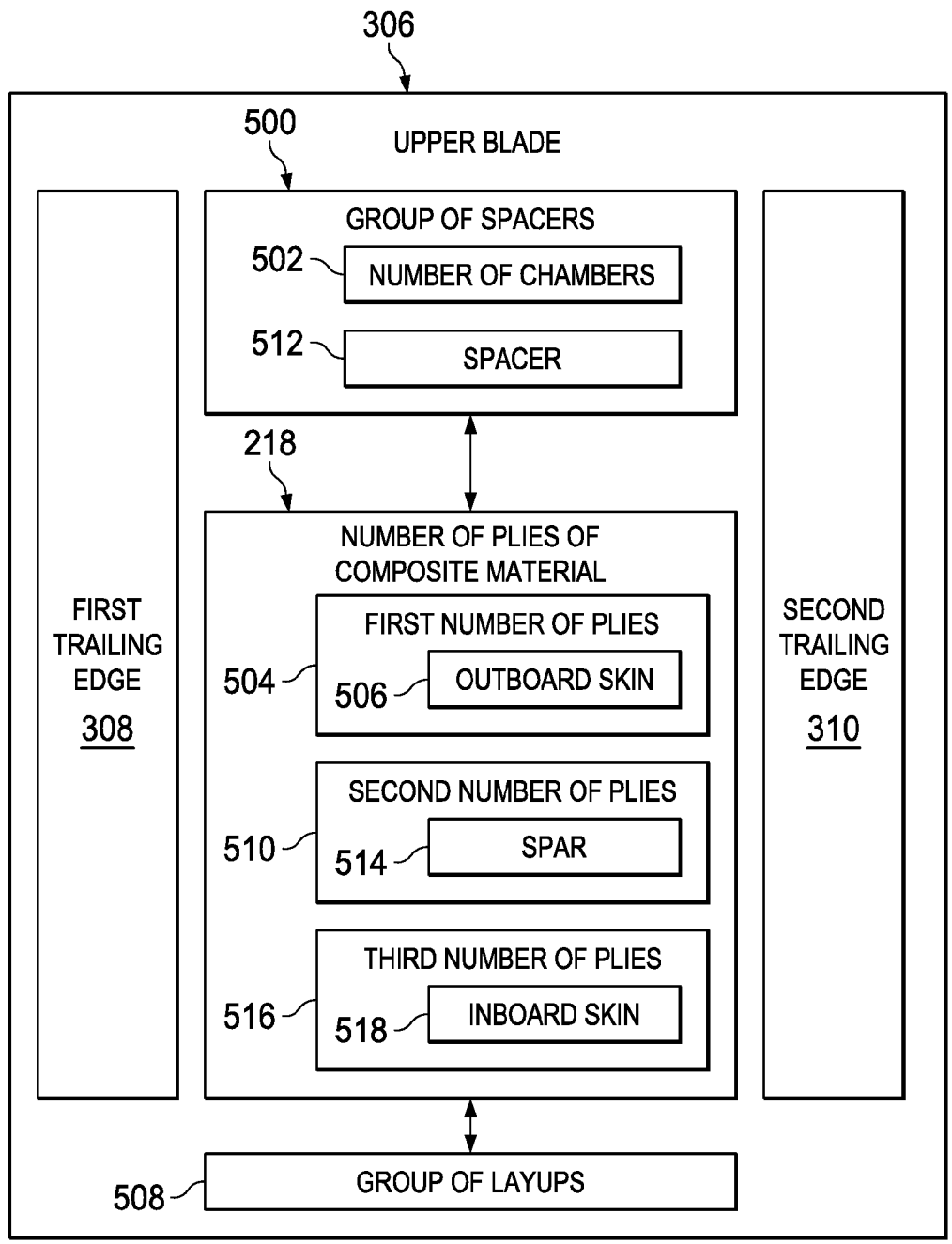
FIG. 5 is an illustration of a block diagram of an upper blade of a composite winglet in accordance with an illustrative embodiment.

Referring now to FIG. 5, an illustration of a block diagram of an upper blade of a composite winglet is depicted in accordance with an illustrative embodiment. In this depicted example, a more-detailed illustration of upper blade 306 of composite winglet 208 from FIG. 3 is shown.

As depicted, upper blade 306 is formed using number of plies of composite material 218 and group of spacers 500. Group of spacers 500 forms number of chambers 502 within the interior of upper blade 306.

In this illustrative example, one of group of spacers 500 is selected from at least one of a caul plate, a bag, a bag carrier, a mandrel, or some other suitable spacer.

Group of spacers 500 may be comprised of a material selected from one of aluminum, foam, cork, a water-soluble powder, carbon, and other suitable materials. These materials may be selected to be flexible such that group of spacers 500 may be extracted from composite winglet 208 after curing. In some cases, the group of spacers 500 may have to be segmented in addition to being flexible, in order to be extracted through constrictions in the cured part.

Group of spacers 500 may be positioned within tool 204 to form number of chambers 502 within the interior of upper blade 306 when upper blade 306 is cured. In some illustrative examples, group of spacers 500 are inflated prior to curing of composite winglet 208 to exert pressure on the inner skin of upper blade 306.

As illustrated, first number of plies 504 is laid up on tool 204 to form outboard skin 506 of upper blade 306. As one illustrative example, first number of plies 504 may include two plies of carbon fiber reinforced polymer material. In other illustrative examples, first number of plies 504 may include more or fewer than two plies.

Group of layups 508 may then be placed on tool 204. Group of layups 508 comprises second number of plies 510 covering spacer 512 to form spar 514 to provide support in the interior of upper blade 306.

One or more additional spacers in group of spacers 500 may be positioned in tool 204 to form number of chambers 502. Third number of plies 516 is then positioned over spar 514 and group of spacers 500 to form inboard skin 518 of upper blade 306.

Second number of plies 510 and third number of plies 516 may also comprise two plies in some illustrative examples. Other suitable configurations of plies may be implemented in other illustrative examples.

Although the components described herein are described with reference to upper blade 306, lower blade 312 also may include the same components. In other illustrative examples, lower blade 312 includes components in addition to or in place of the ones illustrated for upper blade 306.

The illustrations of composite winglet 208 and the components within composite winglet 208 in FIGS. 2-5 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For instance, in some illustrative examples, composite winglet 208 may have only one blade arranged at an angle relative to a wing of the aircraft. As an example, the blade may be angled upward from the wing of the aircraft.

In other illustrative examples, tool 204 may be used to form another type of airfoil structure, such as a horizontal stabilizer or a vertical stabilizer. In this illustrative example, the number of spacers and configurations of plies of composite material may be different than described above.

Figure 6:
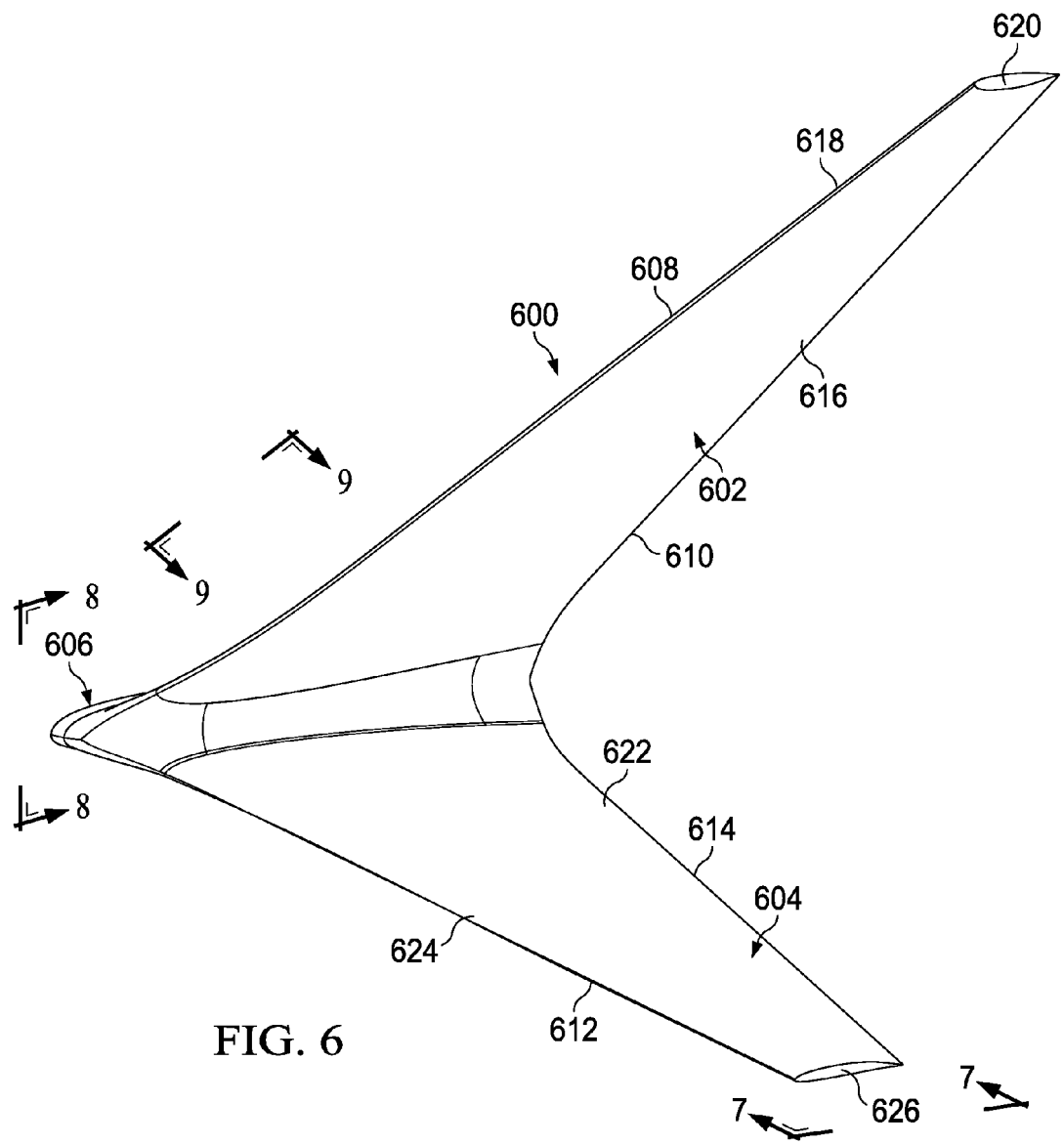
FIG. 6 is an illustration of a perspective view of a composite winglet in accordance with an illustrative embodiment.

Turning now to FIG. 6, an illustration of a perspective view of a composite winglet is depicted in accordance with an illustrative embodiment. In this illustrative example, composite winglet 600 is an example of one implementation for composite winglet 208 shown in block form in FIGS. 2-3.

Composite winglet 600 is a one-piece bifurcated winglet in this illustrative example. In other words, the components within composite winglet 600 have been co-cured to form a single part. As a result, fasteners or other components are not needed to connect one portion of composite winglet 600 to other portions of composite winglet 600. Composite winglet 600 has a smooth surface in this illustrative example.

As depicted, composite winglet 600 comprises upper blade 602, lower blade 604, and root region 606. Upper blade 602, lower blade 604, and root region 606 are examples of implementations for first blade 300, second blade 302, and root region 304 in FIG. 3, respectively.

In this illustrative example, upper blade 602 is longer than lower blade 604. In other illustrative examples, upper blade 602 and lower blade 604 may be the same length. In some illustrative examples, lower blade 604 may be longer than upper blade 602.

As illustrated, upper blade 602 includes leading edge 608 and trailing edge 610, while lower blade 604 includes leading edge 612 and trailing edge 614. Upper blade 602 has outboard skin 616, inboard skin 618, and opening 620. In a similar fashion, lower blade 604 has outboard skin 622, inboard skin 624, and opening 626.

Opening 620 and opening 626 may be configured to receive caps in this illustrative example. The caps may seal opening 620 and opening 626. After curing of composite winglet 208, opening 620 and opening 626 may be used to remove group of spacers 500 in FIG. 5 from the interior of composite winglet 208 before the caps are placed on opening 620 and opening 626.

Figure 7:
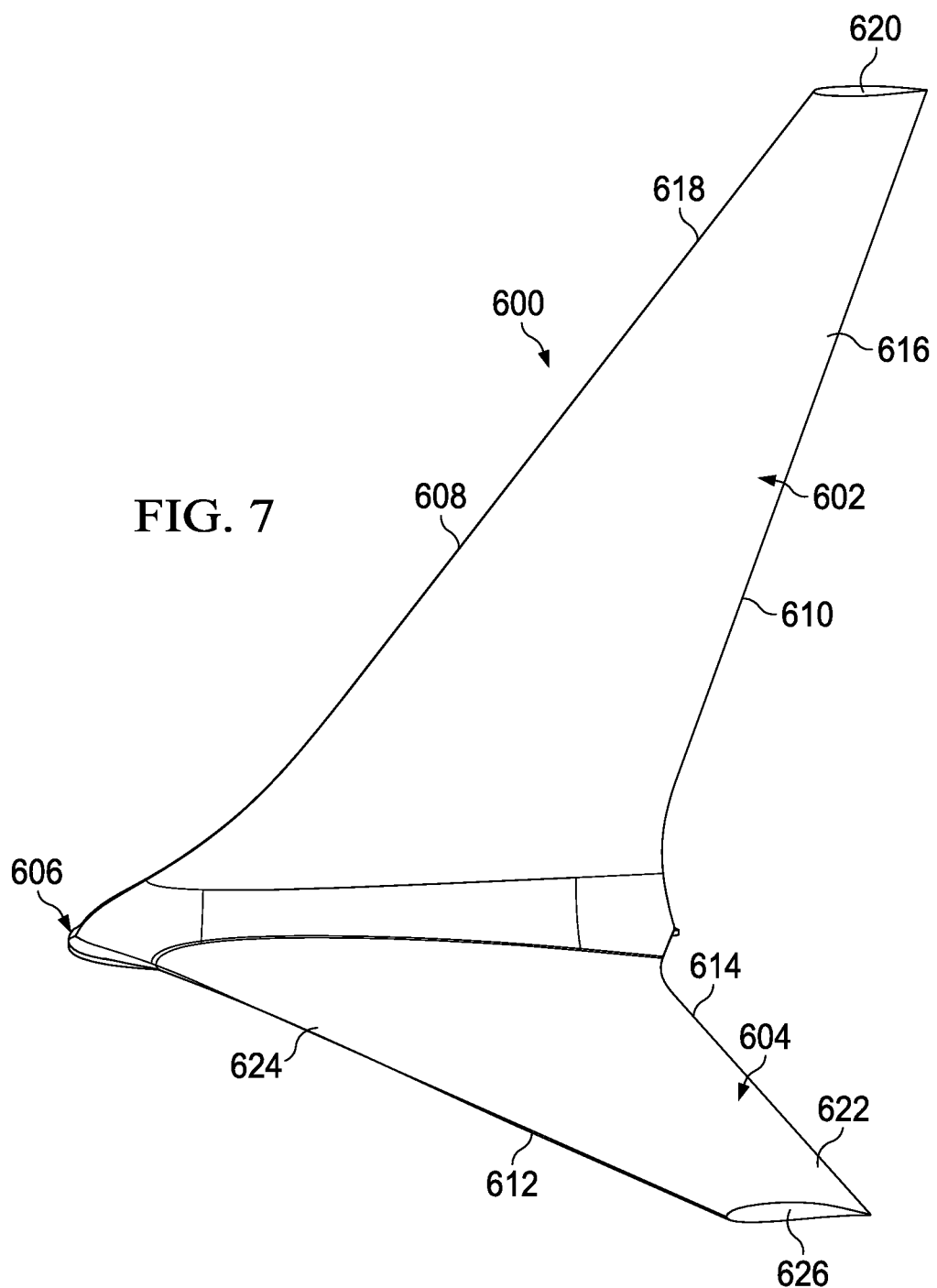
FIG. 7 is an illustration of a side view of a composite winglet in accordance with an illustrative embodiment.

In FIG. 7, an illustration of a side view of a composite winglet is depicted in accordance with an illustrative embodiment. In this depicted example, composite winglet 600 is shown in the direction of view lines 7-7 in FIG. 6.

Figure 8:
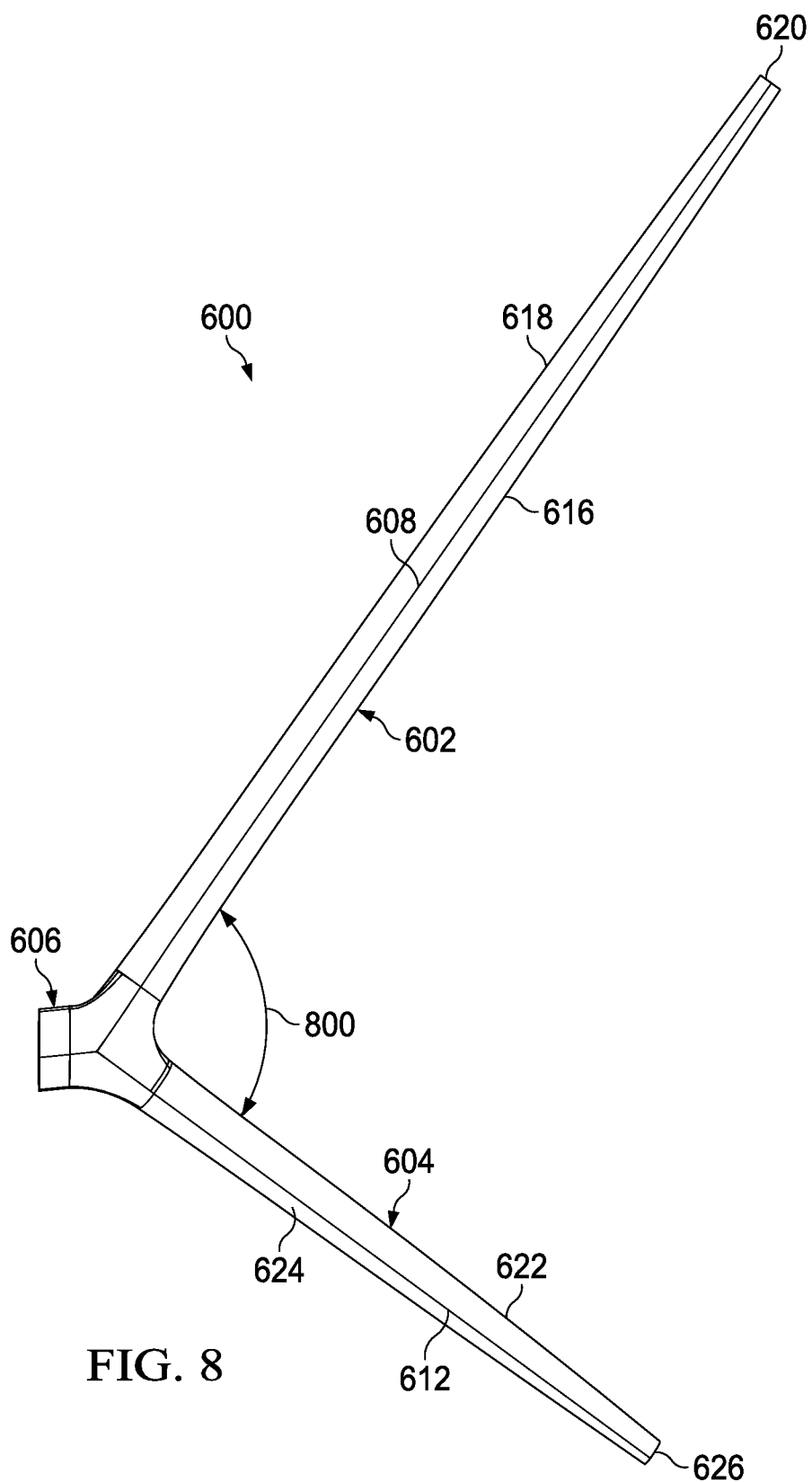
FIG. 8 is an illustration of a front view of a composite winglet in accordance with an illustrative embodiment.

With reference next to FIG. 8, an illustration of a front view of a composite winglet is depicted in accordance with an illustrative embodiment. In this view, composite winglet 600 is shown in the direction of view lines 8-8 in FIG. 6.

As illustrated, upper blade 602 and lower blade 604 are positioned at angle 800 with respect to one another. Angle 800 may be selected to achieve a desired level of aerodynamic performance for composite winglet 600.

Figure 9:
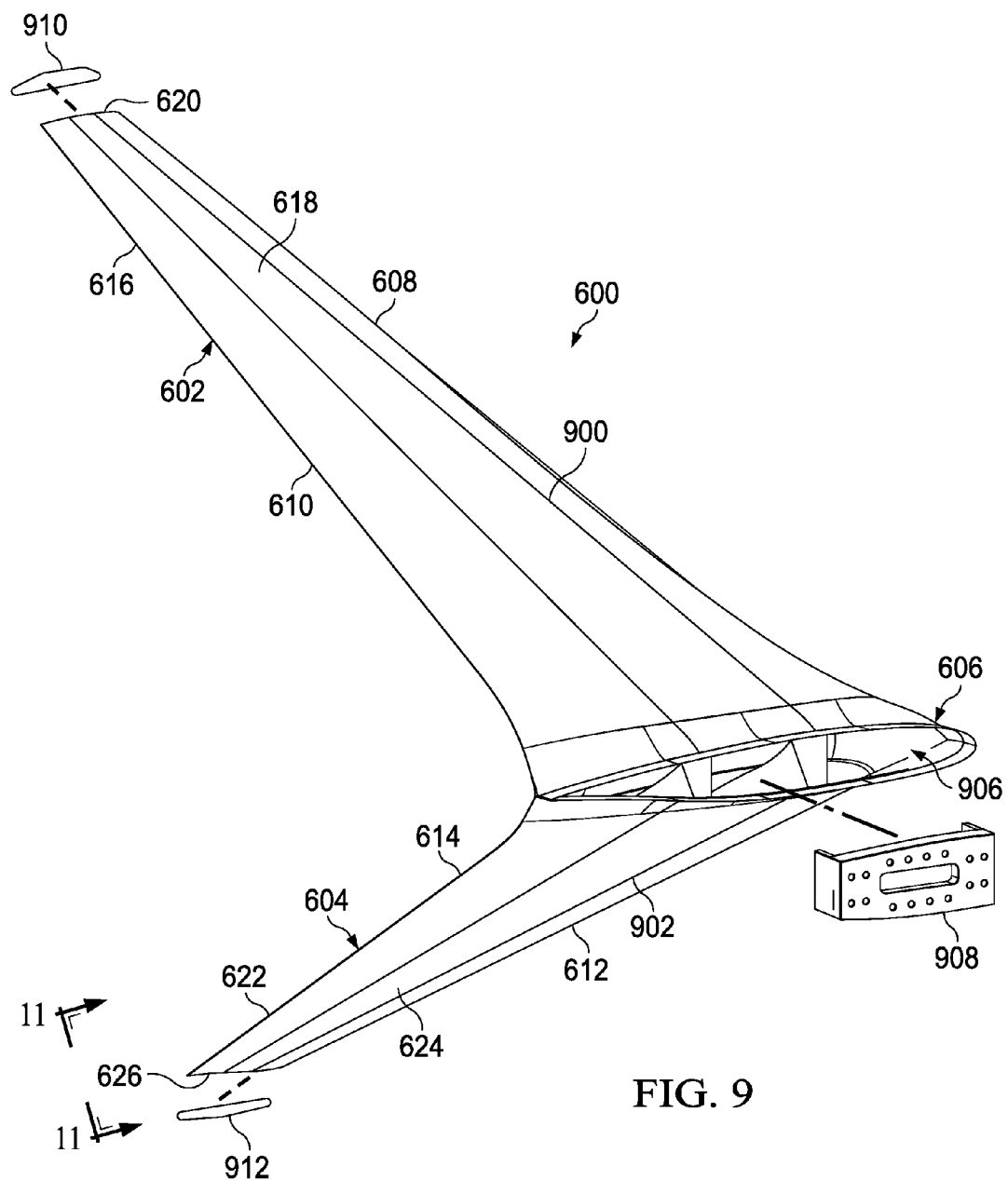
FIG. 9 is an illustration of a perspective view of a composite winglet in accordance with an illustrative embodiment.

Turning now to FIG. 9, an illustration of a perspective view of a composite winglet is depicted in accordance with an illustrative embodiment. In this illustrative example, composite winglet 600 is shown in the direction of view lines 9-9 in FIG. 6.

As illustrated, spar 900 and spar 902 are shown in phantom in this figure. Spar 900 is configured to provide support for upper blade 602, while spar 902 is configured to provide support for lower blade 604. Spar 900 and spar 902 may be examples of implementations for spar 514 in FIG. 5.

In this depicted example, root region 606 of composite winglet 600 comprises channel 906 configured to receive attachment system 908 to attach composite winglet 600 to a wing of an aircraft. Cap 910 and cap 912 are also present in this illustrative example.

Cap 910 is configured to seal opening 620 in upper blade 602 after group of spacers 500 shown in block form in FIG. 5 is removed from upper blade 602. Cap 910 seals opening 620 in upper blade 602 such that a fluid does not pass between the interface of cap 910 and the inner skin of upper blade 602. This fluid may be air, water, or some other type of fluid in the environment around composite winglet 600.

As illustrated, cap 912 is configured to seal opening 626 in lower blade 604 after group of spacers 500 is removed from lower blade 604. Cap 912 seals opening 626 in lower blade 604 such that fluid does not pass between the interface of cap 912 and the inner skin of lower blade 604.

Figure 10:
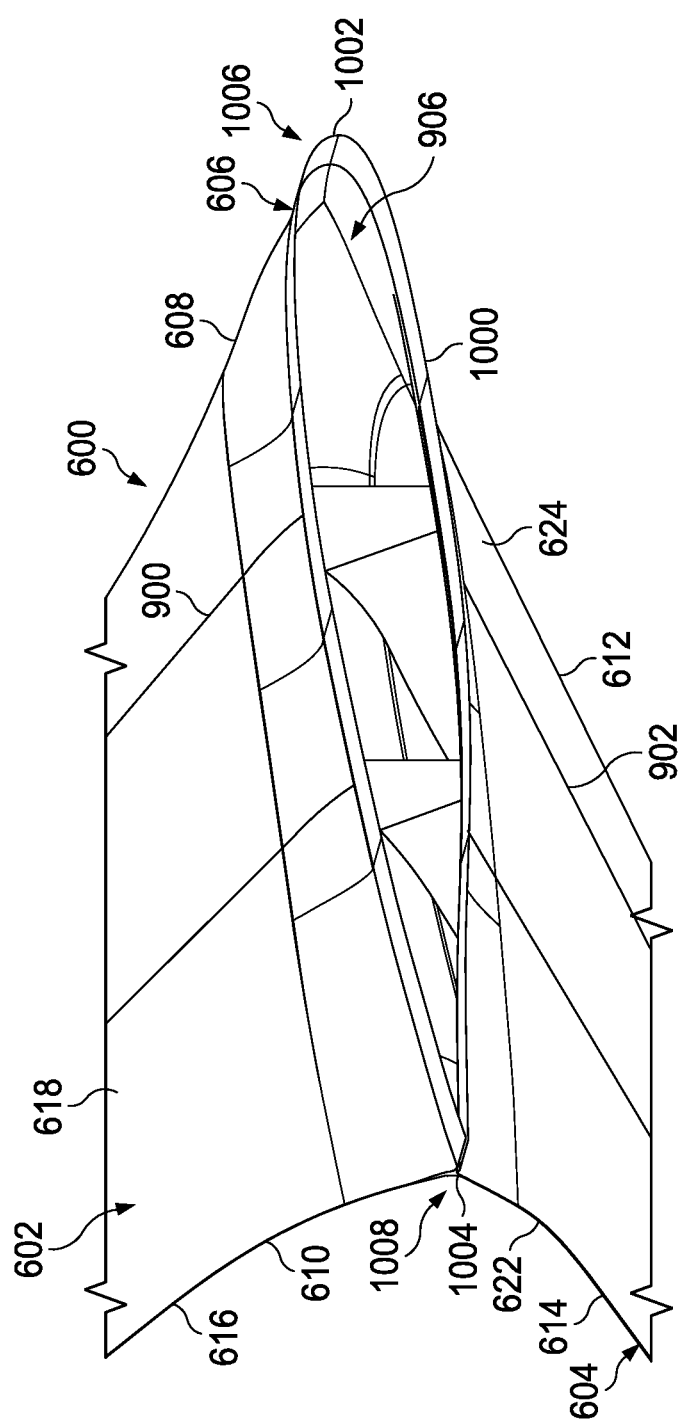
FIG. 10 is an illustration of a root region in accordance with an illustrative embodiment.

In FIG. 10, an illustration of a root region is depicted in accordance with an illustrative embodiment. In this depicted example, a closer view of root region 606 is shown.

As depicted, root region 606 has shape 1000. Shape 1000 is configured to provide a desired level of aerodynamic performance for composite winglet 600. Root region 606 has leading edge 1002 and trailing edge 1004. Leading edge 1002 is a location where leading edge 608 of upper blade 602 and leading edge 612 of lower blade 604 meet. In a similar fashion, trailing edge 1004 is a location where trailing edge 610 of upper blade 602 and trailing edge 614 of lower blade 604 meet.

In this illustrative example, leading edge 1002 of root region 606 has curved shape 1006, while trailing edge 1004 of root region 606 has pointed shape 1008. In some illustrative examples, the shape of leading edge 1002 and trailing edge 1004 may be different than shown in this figure, depending on the functionality of composite winglet 600.

Figure 11:
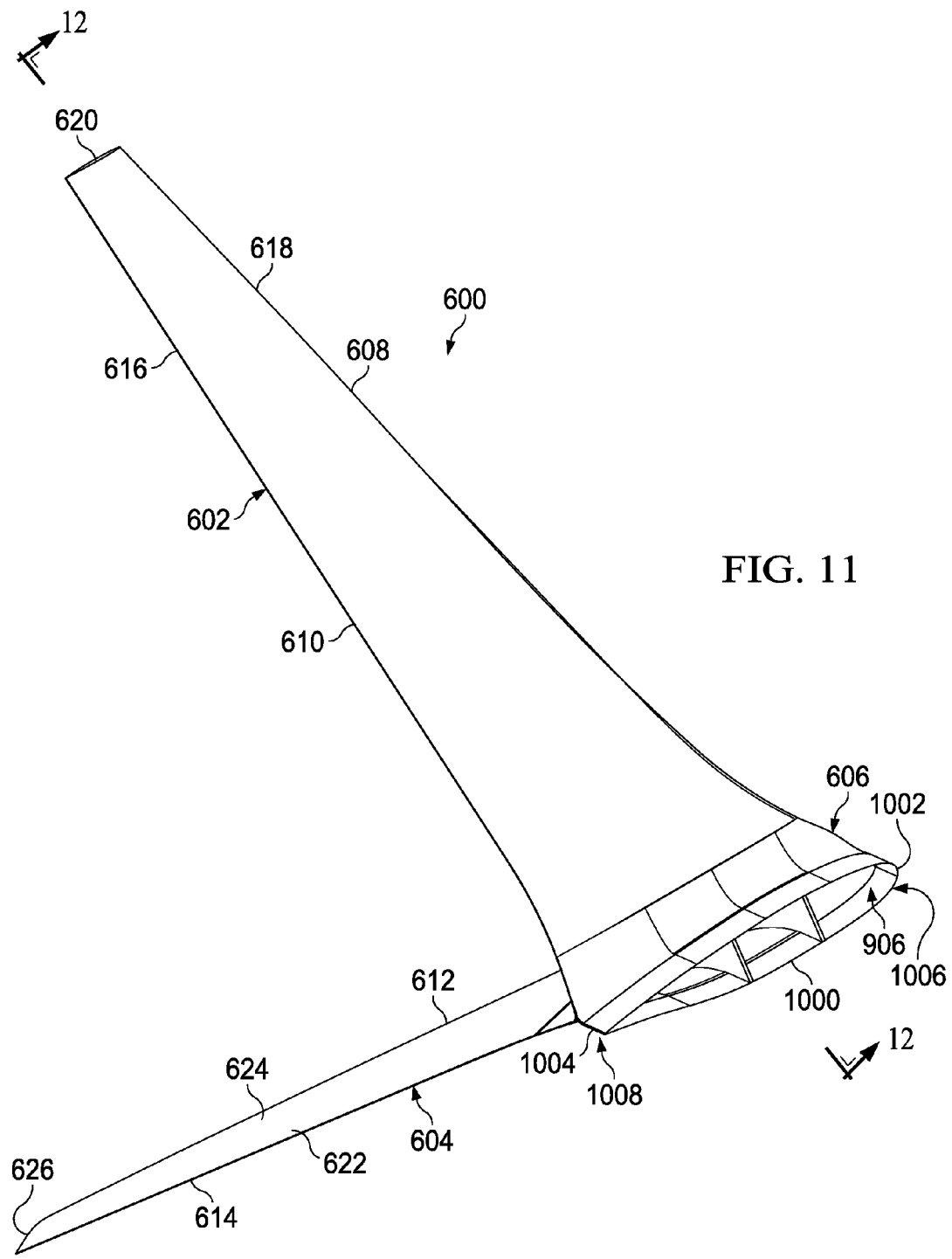
FIG. 11 is an illustration of a back view of a composite winglet in accordance with an illustrative embodiment.

Referring now to FIG. 11, an illustration of a back view of a composite winglet is depicted in accordance with an illustrative embodiment. In this illustrative example, composite winglet 600 is shown in the direction of view lines 11-11 in FIG. 9.

Figure 12:
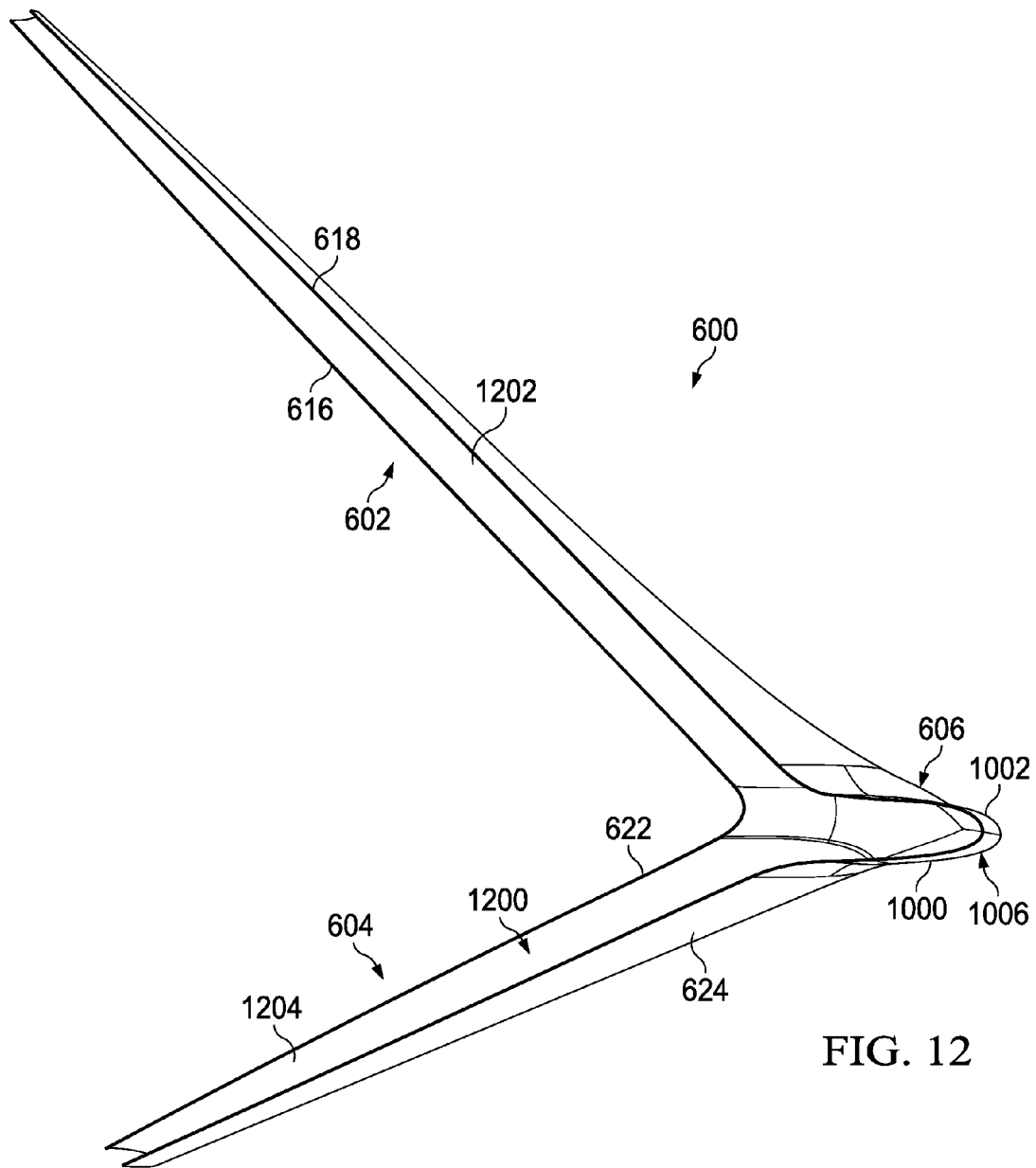
FIG. 12 is an illustration of a cross-sectional view of a composite winglet in accordance with an illustrative embodiment.

Turning next to FIG. 12, an illustration of a cross-sectional view of a composite winglet is depicted in accordance with an illustrative embodiment. In this illustrative example, a cross-sectional view of composite winglet 600 is shown taken along lines 12-12 in FIG. 11.

As depicted, composite winglet 600 includes number of chambers 1200. Number of chambers 1200 is an example of one implementation for number of chambers 502 shown in block form in FIG. 5.

In this illustrative example, upper blade 602 includes chamber 1202 and lower blade 604 includes chamber 1204. Chamber 1202 and chamber 1204 may be formed using spacers during curing of composite winglet 600.

Figure 13:
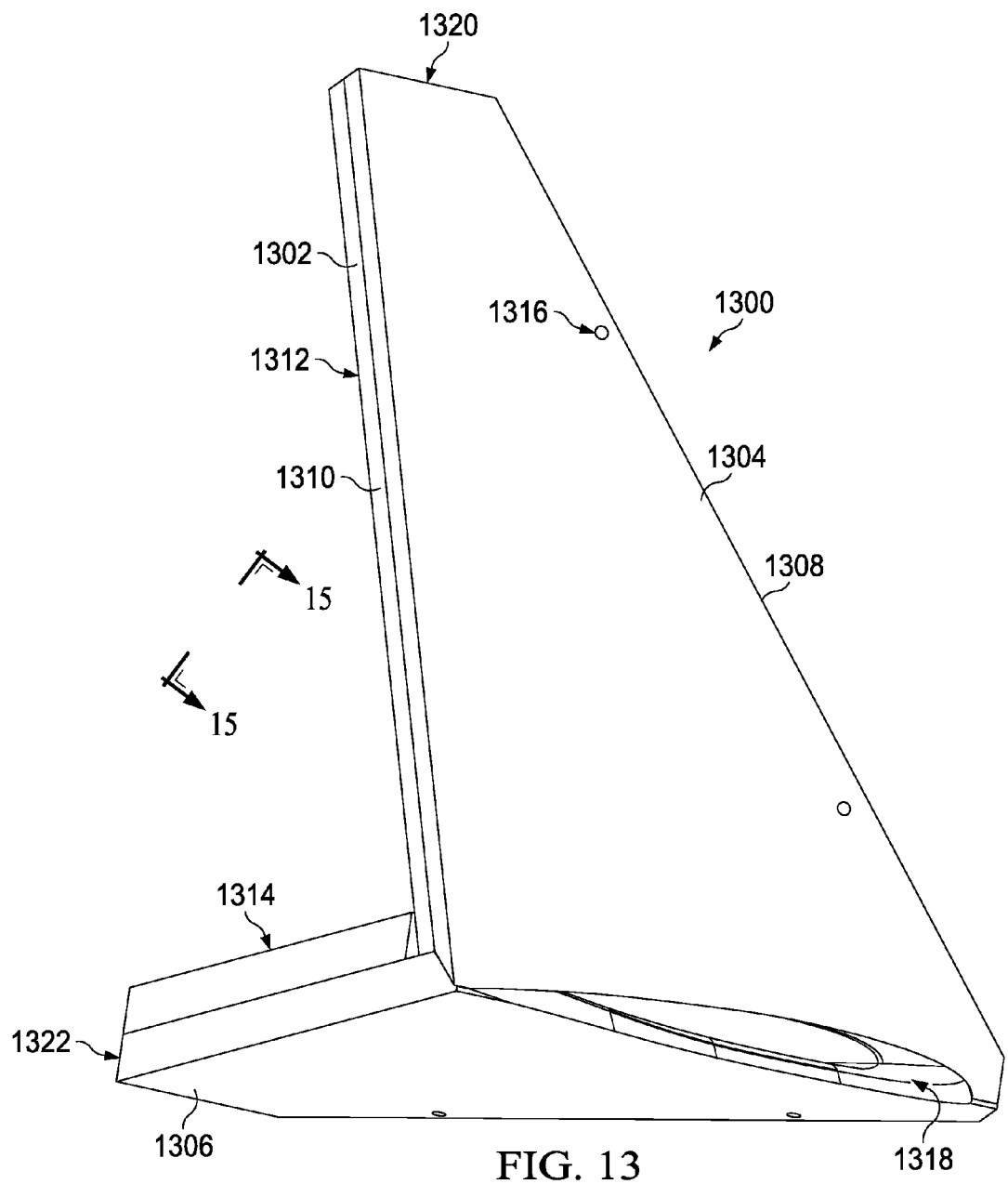
FIG. 13 is an illustration of a perspective view of a tool for forming a composite winglet in accordance with an illustrative embodiment.

In FIG. 13, an illustration of a perspective view of a tool for forming a composite winglet is depicted in accordance with an illustrative embodiment. In this illustrative example, tool 1300 is an example of one implementation for tool 204 shown in block form in FIG. 2.

As depicted, tool 1300 includes first part 1302, second part 1304, and third part 1306. Tool 1300 has leading edge 1308 and trailing edge 1310 in this illustrative example.

As illustrated, first part 1302 of tool 1300 includes upper portion 1312 and lower portion 1314. Tool 1300 includes a number of openings 1316 in leading edge 1308 of tool 1300. The number of openings 1316 is configured to receive a fastener system (not shown in this view) to seal tool 1300.

In this illustrative example, gap 1318 is also present in tool 1300. Gap 1318 is used to form the shape of a root region of a composite winglet in this depicted example. For example, gap 1318 may form shape 1000 of root region 606 shown in FIG. 10.

In some illustrative examples, a number of additional gaps may be present in tool 1300. For instance, gaps may be present in at least one of tip 1320 or tip 1322 of tool 1300 in these illustrative examples.

Tool 1300 may be used to form composite winglet 600 shown in FIG. 6. In particular, upper portion 1312 of first part 1302 and second part 1304 may be used to form upper blade 602 of composite winglet 600, while lower portion 1314 of first part 1302 and third part 1306 may be configured to form lower blade 604 of composite winglet 600.

Figure 14:
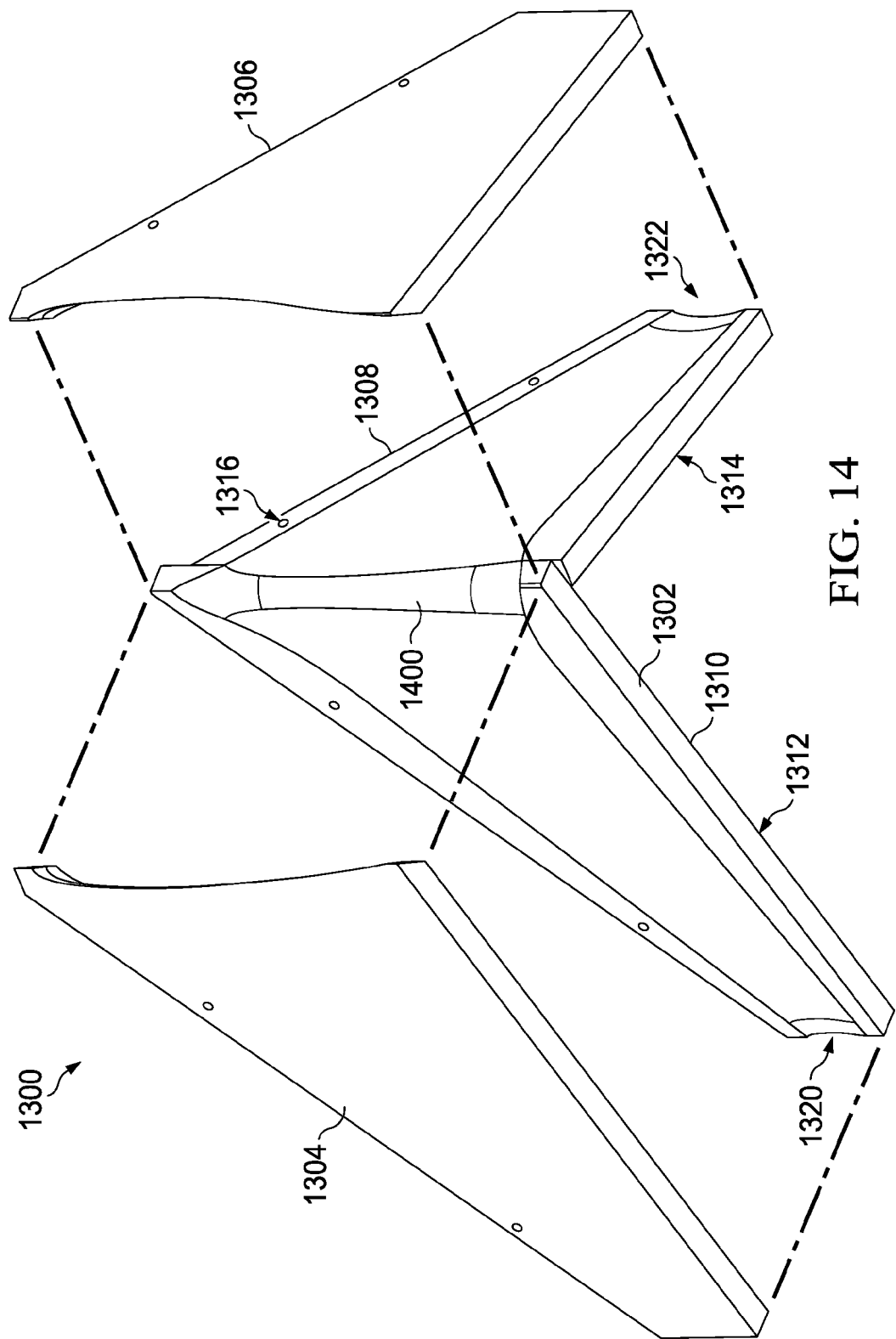
FIG. 14 is an illustration of an exploded view of a tool for forming a composite winglet in accordance with an illustrative embodiment.

With reference next to FIG. 14, an illustration of an exploded view of a tool for forming a composite winglet is depicted in accordance with an illustrative embodiment. In this depicted example, an exploded view of tool 1300 from FIG. 13 is shown.

As illustrated, upper portion 1312 and lower portion 1314 of first part 1302 of tool 1300 are connected at transition region 1400. Transition region 1400 is a region where upper portion 1312 and lower portion 1314 are welded together in this illustrative example.

Figure 15:
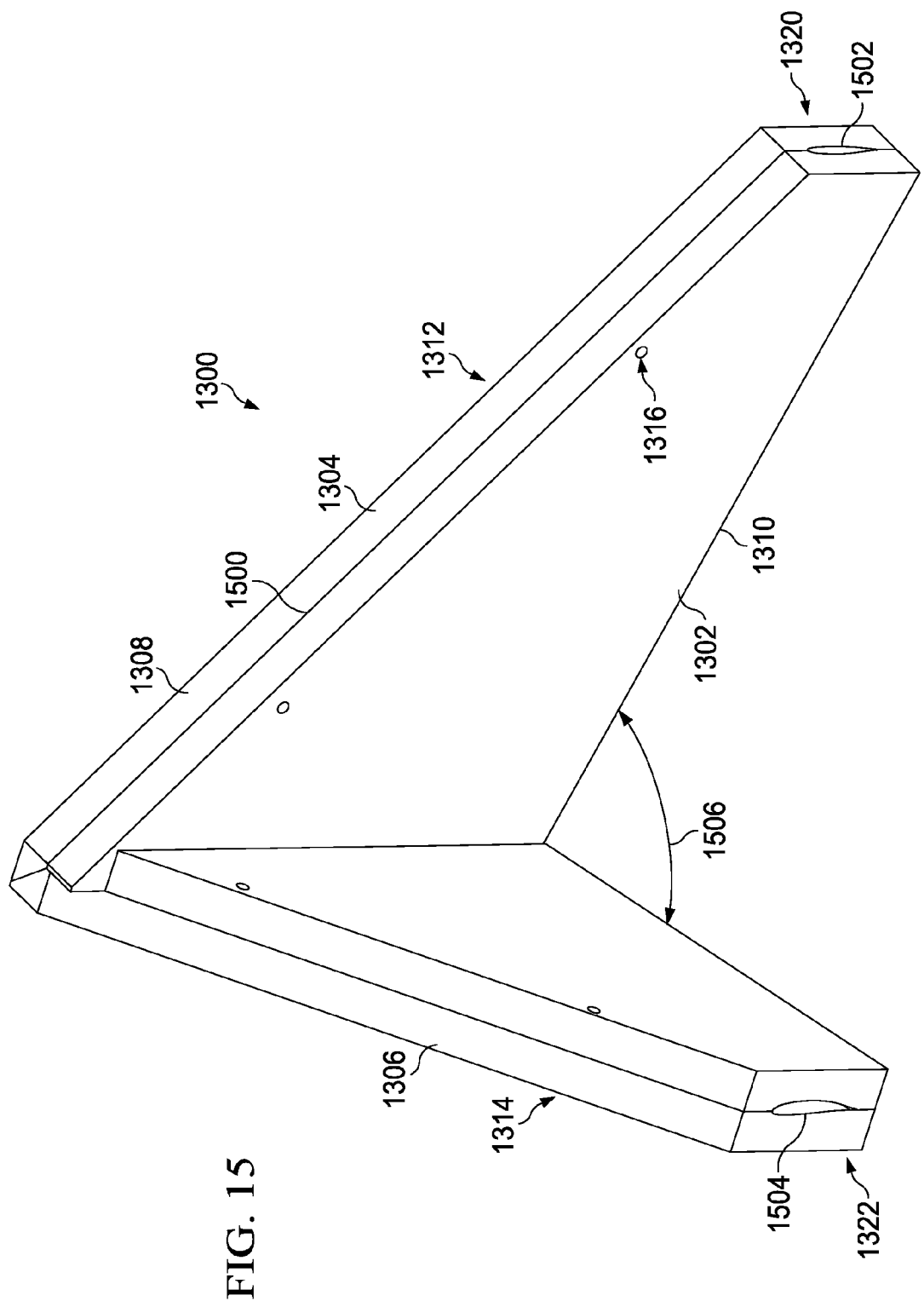
FIG. 15 is an illustration of a tool for forming a composite winglet in accordance with an illustrative embodiment.

Turning now to FIG. 15, an illustration of a tool for forming a composite winglet is depicted in accordance with an illustrative embodiment. In this depicted example, tool 1300 is shown in the direction of view lines 15-15 in FIG. 13.

As illustrated, tool 1300 has parting line 1500 in leading edge 1308. Parting line 1500 is the portion of tool 1300 where second part 1304 and third part 1306 may be attached to first part 1302 of tool 1300.

In this depicted example, gap 1502 in tip 1320 of tool 1300 and gap 1504 in tip 1322 of tool 1300 may be seen more clearly. Gap 1502 and gap 1504 may be configured to form opening 620 and opening 626, respectively, in composite winglet 600 in FIG. 6.

In this illustrative example, upper portion 1312 of first part 1302 and second part 1304 are arranged at angle 1506 relative to lower portion 1314 of first part 1302 and third part 1306. Angle 1506 may be selected to form a desired angle for the composite winglet. For instance, angle 1506 may be selected to form angle 800 for composite winglet 600 as shown in FIG. 8.

Figure 16:
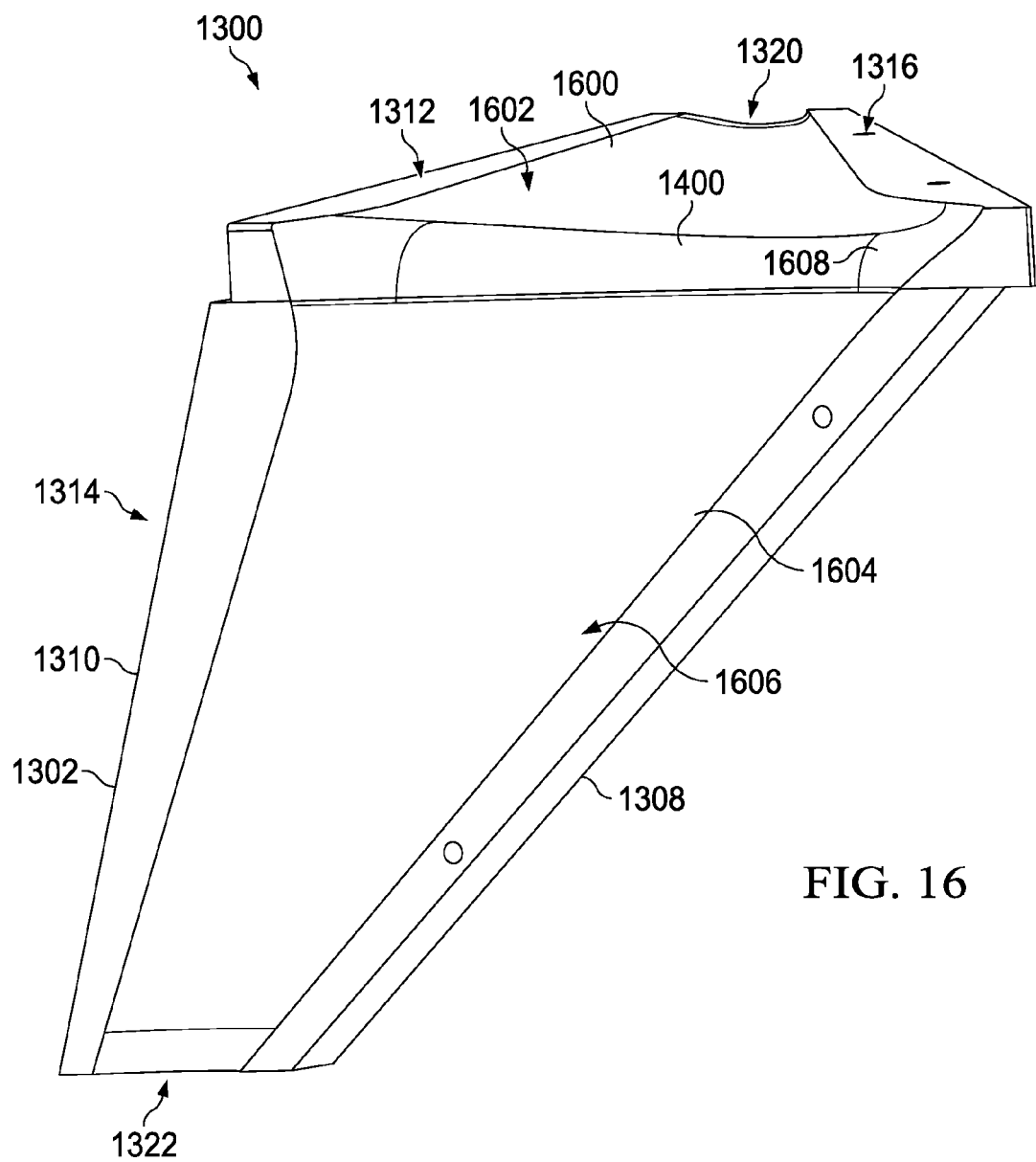
FIG. 16 is an illustration of a first part of a tool for forming an outboard skin of a composite winglet in accordance with an illustrative embodiment.

In FIG. 16, an illustration of a first part of a tool for forming an outboard skin of a composite winglet is depicted in accordance with an illustrative embodiment. In this depicted example, a more-detailed view of first part 1302 is shown.

As depicted, inner surface 1604 of lower portion 1314 of first part 1302 forms cavity 1606. In this illustrative example, cavity 1606 is used to form the shape of a lower blade of a composite winglet. For instance, cavity 1606 may form lower blade 604 of composite winglet 600 in FIG. 6.

In this depicted example, inner surface 1600 of upper portion 1312 of first part 1302 has cavity 1602 used to form the shape of an upper blade of a composite winglet. For example, cavity 1602 may form upper blade 602 of composite winglet 600 in FIG. 6.

As illustrated, lip 1608 is seen in upper portion 1312. Lip 1608 in upper portion 1312 of first part 1302 of tool 1300 is configured to form a leading edge of an upper blade of a winglet. For instance, lip 1608 may be configured to form leading edge 608 of upper blade 602 of composite winglet 600 in FIG. 6.

Lower portion 1314 also includes a lip (not shown in this view) configured to form a leading edge of a lower blade of a composite winglet. For example, the lip may form leading edge 612 of lower blade 604 of composite winglet 600 in FIG. 6.

In this illustrative example, the shape of inner surface 1600 and inner surface 1604 may be selected to form a desired shape of the outboard skin of a composite winglet. In a similar fashion, although not shown in this view, the inner surface of second part 1304 and third part 1306 also may be selected to form a desired shape of the inboard skin of a composite winglet. As a result, the composite winglet may be designed to have a smooth surface, which increases the aerodynamic performance and the strength of the composite winglet.

FIGS. 17-22 illustrate one example of a process used for forming a composite winglet. In this illustrative example, FIGS. 17-22 show different steps in a process for forming composite winglet 2400 shown in FIG. 24.

Figure 17:
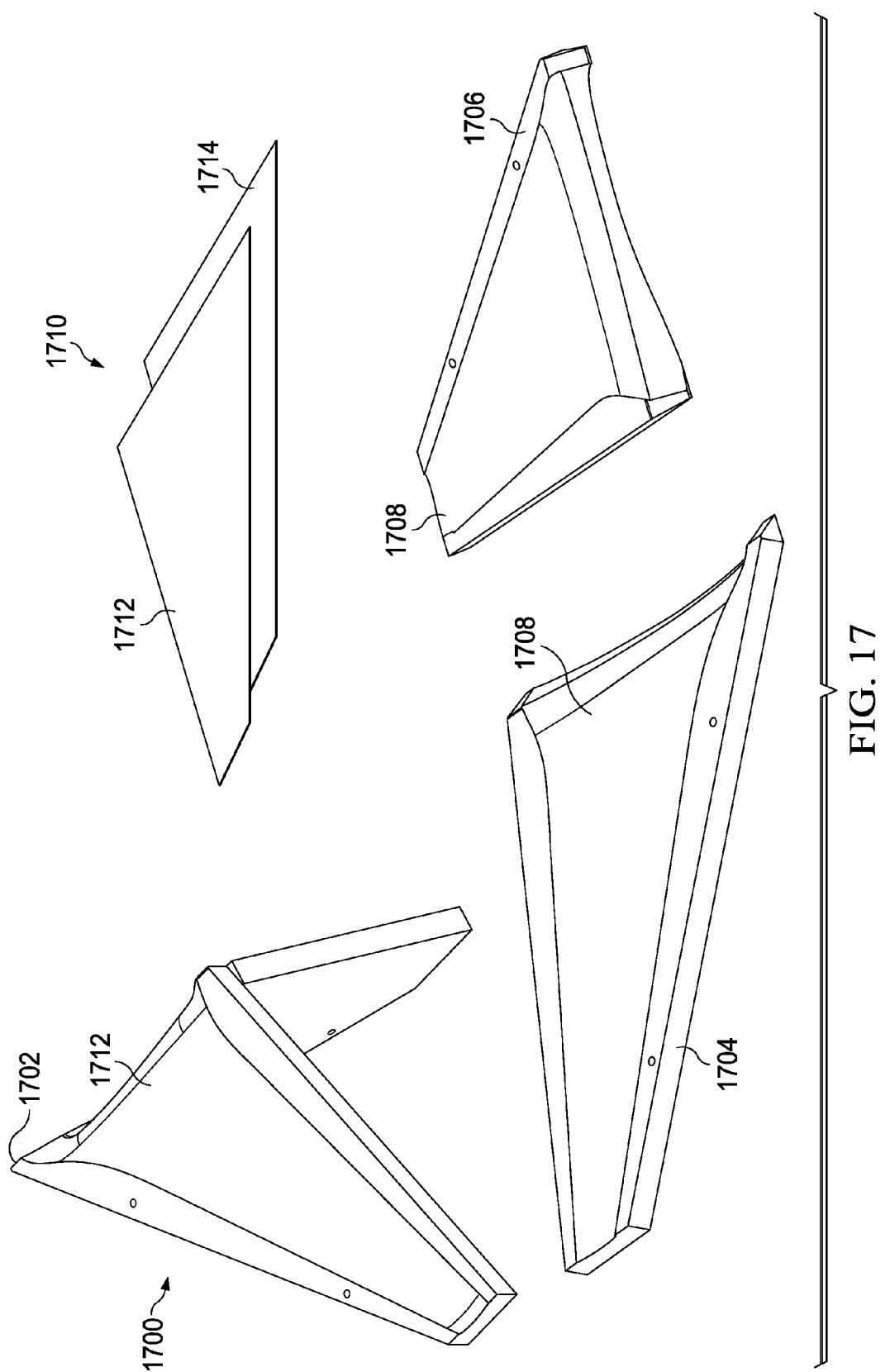
FIG. 17 is an illustration of a tool for forming a composite winglet in accordance with an illustrative embodiment.

Referring to FIG. 17, an illustration of a tool for forming a composite winglet is depicted in accordance with an illustrative embodiment. In this depicted example, tool 1700 with first part 1702, second part 1704, and third part 1706 is shown.

In this illustrative example, tool 1700 may be coated with coating material 1708. Coating material 1708 may be a mold release agent that is configured to coat the inner surfaces of tool 1700 such that the composite winglet may be more easily separated from tool 1700 after curing of the composite winglet.

As depicted, number of plies of composite material 1710 may be cut and placed into first part 1702 of tool 1700. Number of plies of composite material 1710 form the outboard skin of composite winglet 2400 in FIG. 24. In particular, first number of plies 1712 forms the outboard skin of an upper blade of composite winglet 2400, while second number of plies 1714 forms the outboard skin of a lower blade of composite winglet 2400 in these illustrative examples.

Figure 18:
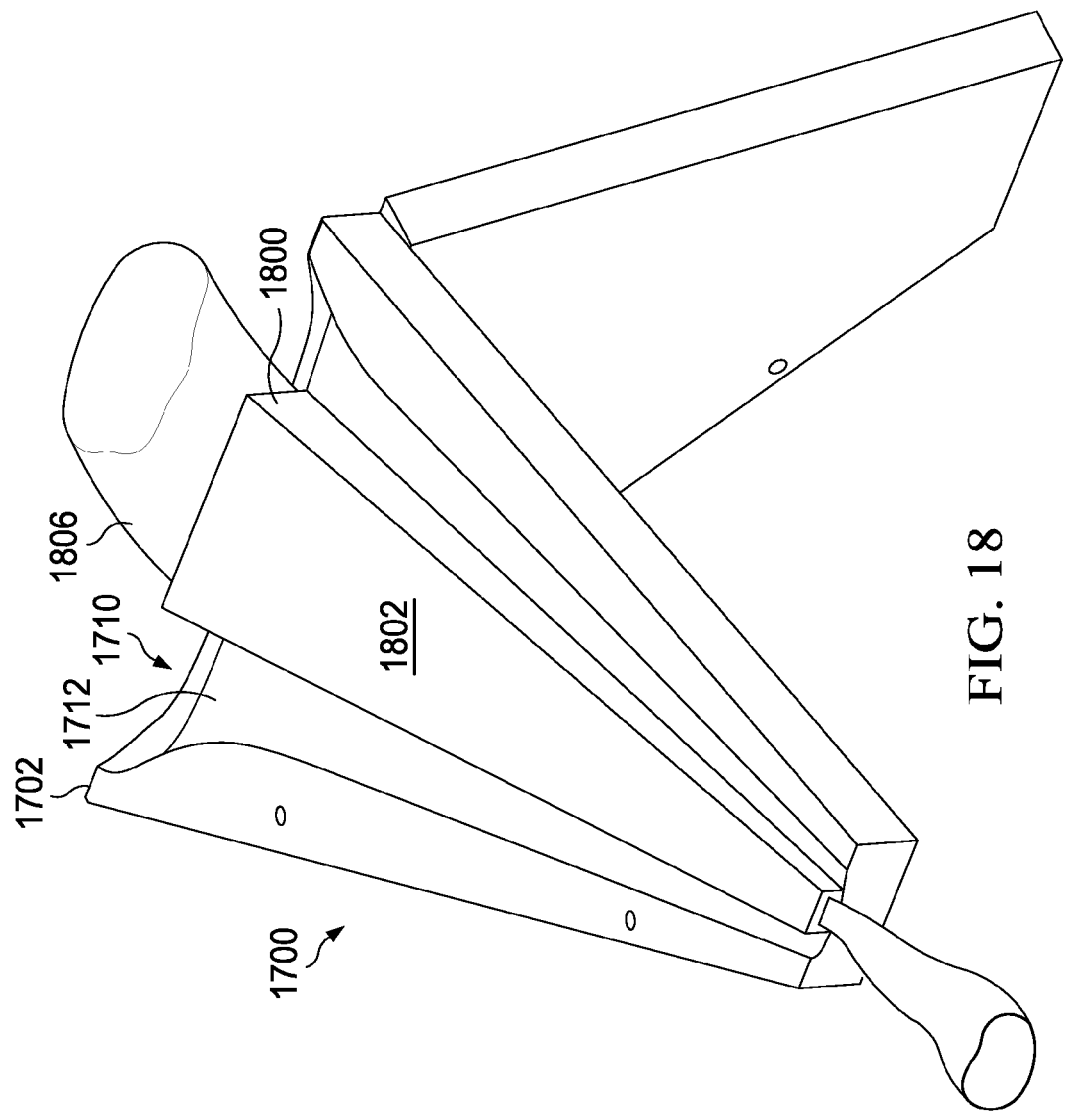
FIG. 18 is an illustration of a tool with a group of layups in accordance with an illustrative embodiment.

In FIG. 18, an illustration of a tool with a group of layups is depicted in accordance with an illustrative embodiment. In this depicted example, layup 1800 has been positioned in tool 1700.

As illustrated, layup 1800 may be comprised of third number of plies 1802 of composite material wrapped around spacer 1804. In this illustrative example, spacer 1804 is made of a bag carrier (not shown) positioned within bag 1806. In other illustrative examples, layup 1800 may be formed in another manner, depending on the particular implementation.

Figure 19:
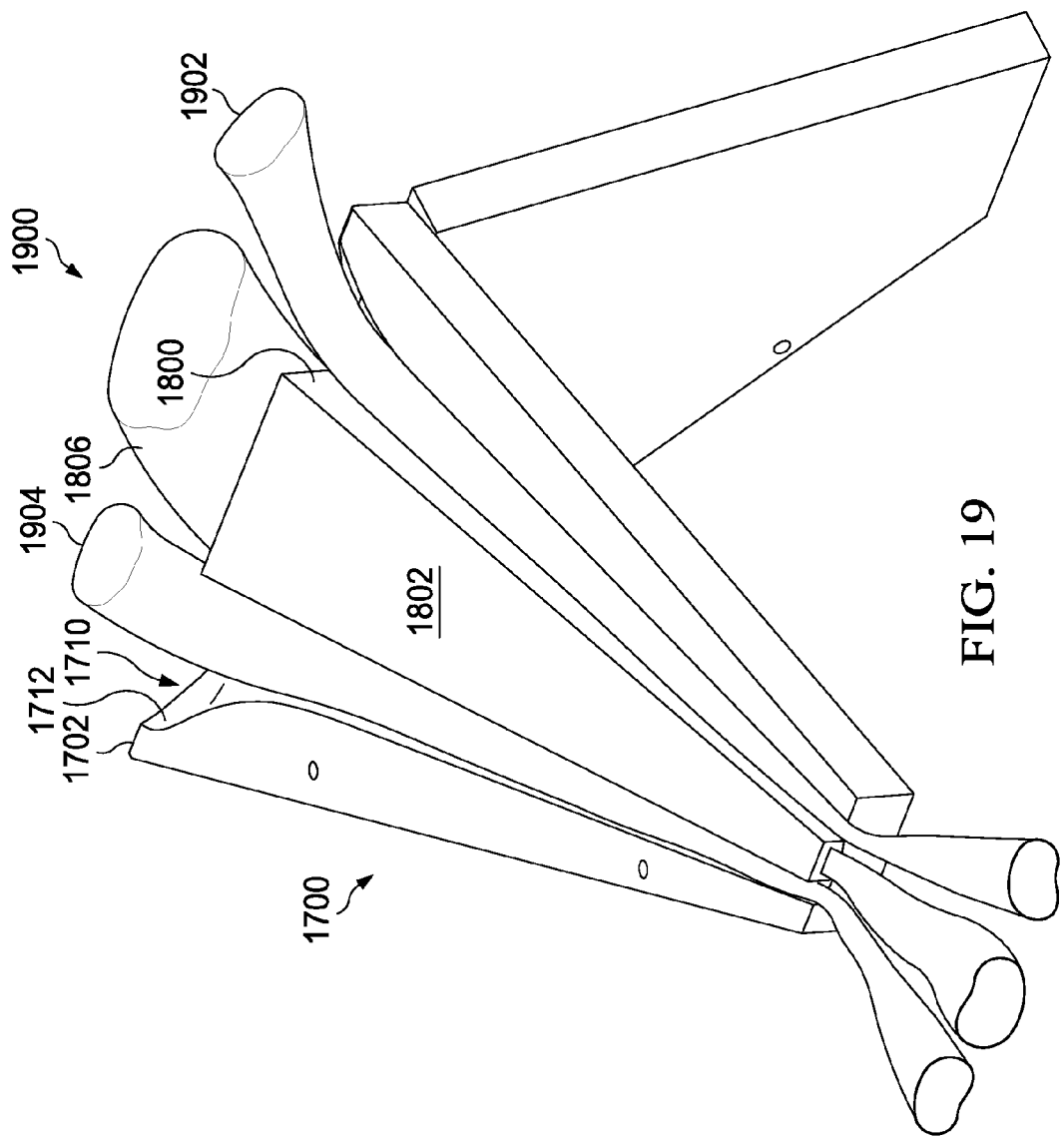
FIG. 19 is an illustration of a tool with a number of spacers in accordance with an illustrative embodiment.

With reference next to FIG. 19, an illustration of a tool with a number of spacers is depicted in accordance with an illustrative embodiment. In this depicted example, number of spacers 1900 is positioned in tool 1700.

As illustrated, number of spacers 1900 includes bag 1902 and bag 1904. Bag 1902, bag 1904, and bag 1806 are configured to be inflated to form chambers within composite winglet 2400 in FIG. 24 in these illustrative examples. In other illustrative examples, number of spacers 1900 may include different types of spacers other than bags, depending on the functionality involved.

Figure 20:
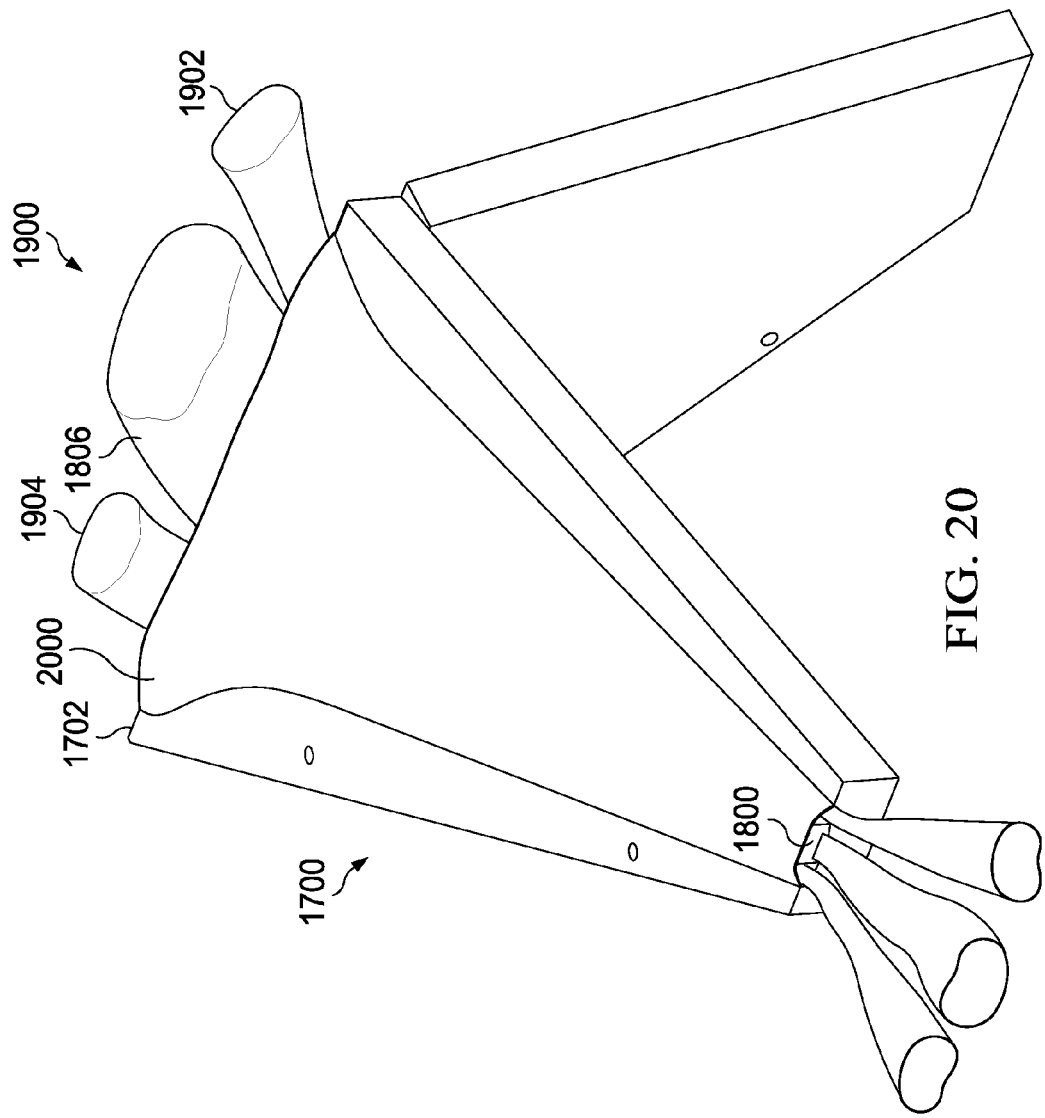
FIG. 20 is an illustration of a tool for forming a composite winglet in accordance with an illustrative embodiment.

Turning now to FIG. 20, an illustration of a tool for forming a composite winglet is depicted in accordance with an illustrative embodiment. In this illustrative example, fourth number of plies 2000 of composite material has been positioned on top of layup 1800. Fourth number of plies 2000 forms the inboard skin of the upper blade of composite winglet 2400 in FIG. 24.

Figure 21:
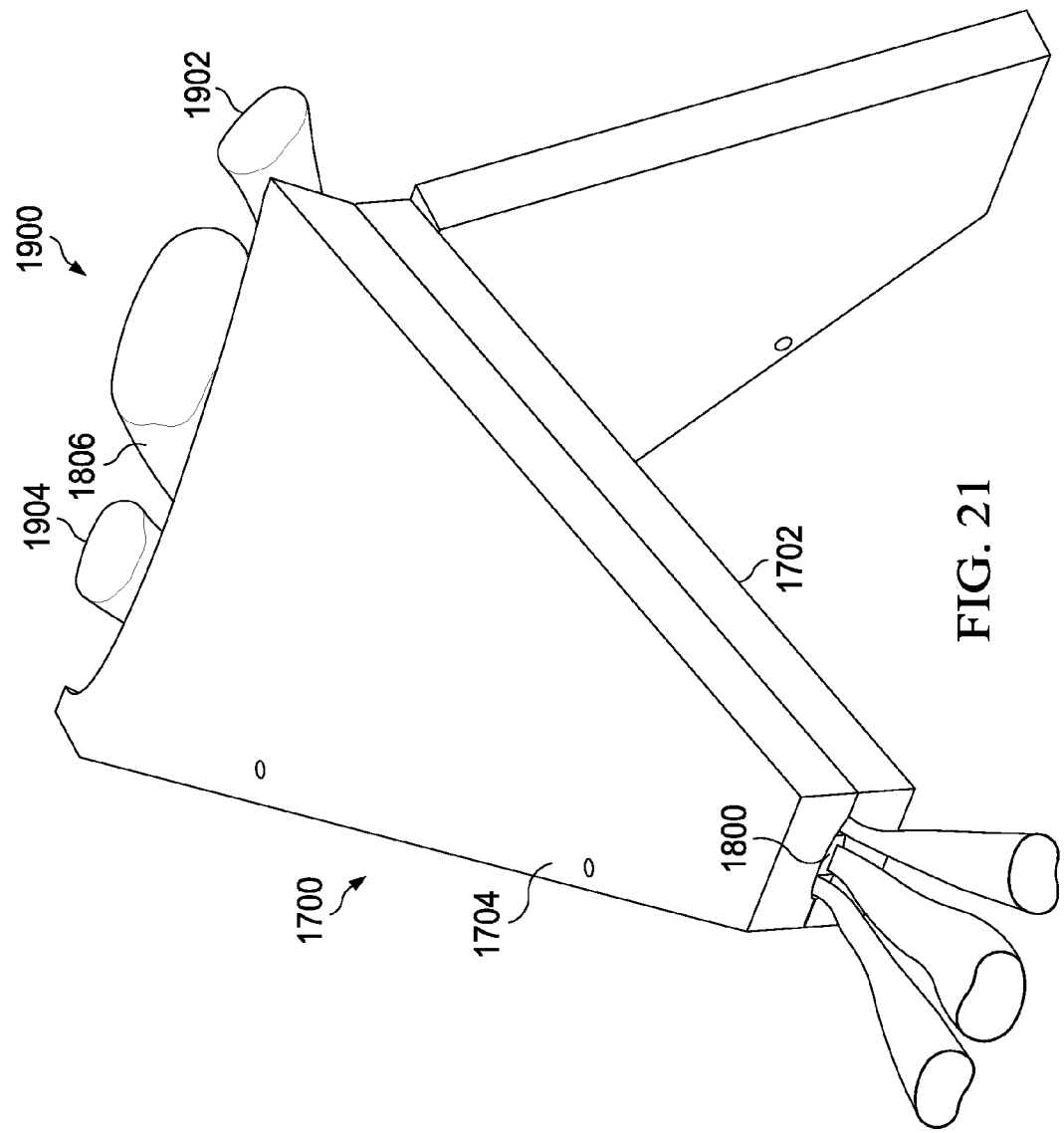
FIG. 21 is an illustration of another tool for forming a composite winglet in accordance with an illustrative embodiment.

In FIG. 21, another illustration of a tool for forming a composite winglet is depicted in accordance with an illustrative embodiment. In this illustrative example, second part 1704 of tool 1700 has been positioned over first number of plies 1712 (not seen in this view), layup 1800, and third number of plies 2000 (not seen in this view).

As illustrated, second part 1704 may be attached to first part 1702 of tool 1700 using a fastener system. In some cases, second part 1704 may be attached to first part 1702 of tool 1700 using a fastener system and then further sealed with tape.

Figure 22:
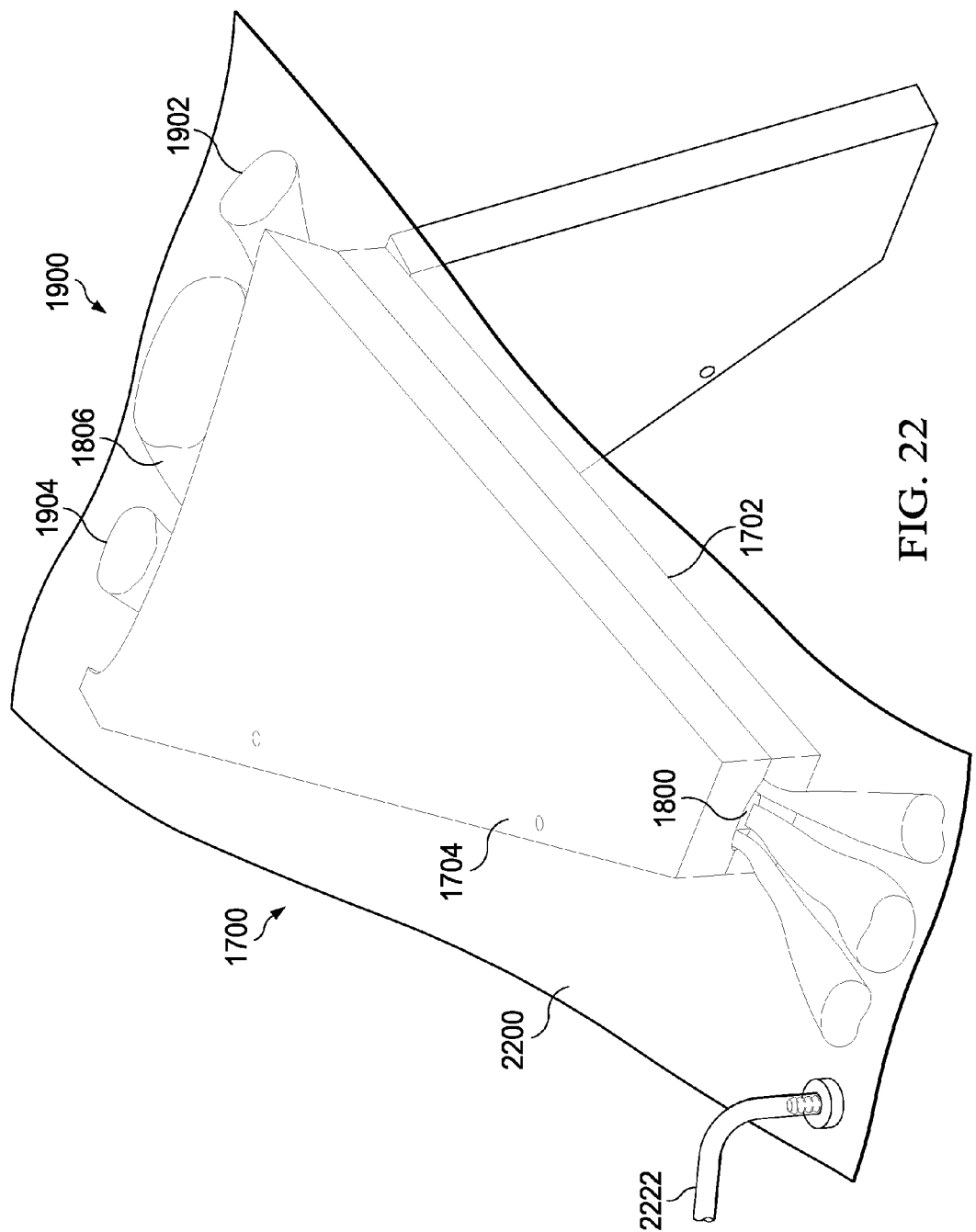
FIG. 22 is an illustration of yet another tool for forming a composite winglet in accordance with an illustrative embodiment.

Referring next to FIG. 22, yet another illustration of a tool for forming a composite winglet is depicted in accordance with an illustrative embodiment. In this depicted example, vacuum bag 2200 has been placed over tool 1700.

As illustrated, vacuum bag 2200 may be sealed and attached to hose 2222. Hose 2222 is connected to a vacuum source (not shown) to pull a vacuum on tool 1700 to cure composite winglet 2400 in FIG. 24. Tool 1700 is exposed to a desired temperature and pressure during the curing process.

Figure 23:
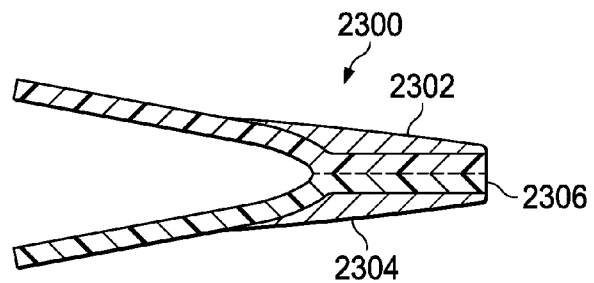
FIG. 23 is an illustration of a lightning strip co-cured with a composite winglet in accordance with an illustrative embodiment.

In FIG. 23, an illustration of a lightning strip co-cured with a composite winglet is depicted in accordance with and illustrative embodiment. In this illustrative example, lightning strip 2300 has been co-cured a composite winglet. In particular, lightning strip 2300 has been co-cured with composite winglet 2400.

As depicted, lightning strip 2300 may be added to the composite winglet during one of the steps described with reference to FIGS. 17-21, prior to placing vacuum bag 2200 over tool 1700 and curing the composite winglet.

In this depicted example, lightning strip 2300 is configured to dissipate electricity and prevent damage to the composite winglet. Lightning strip 2300 has first portion 2302 and second portion 2304 attached to number of plies of composite material 2306.

Lightning strip 2300 is attached to the composite winglet on the trailing edge of the composite winglet in this illustrative example. In other illustrative examples, lightning strip 2300 may be attached to another portion of the composite winglet or may have a different shape, depending on the particular implementation.

Although the illustrative examples in FIGS. 17-23 are shown with reference to forming an upper blade of a composite winglet, the lower blade of the composite winglet may be formed in a similar manner and at the same time as the upper blade. In some illustrative examples, it may be desirable to form the lower blade and upper blade at different times.

The different illustrations in FIGS. 17-23 only show some of the operations or stages for forming a composite winglet. Other components, operations, and stages may be present in addition to in place of the ones depicted in FIGS. 17-23. For example, a release layer may be used in addition or in place of coating material 1708 on tool 1700.

In other illustrative examples, a number of additional spars may be positioned in tool 1700. In still other illustrative examples, tool 1700 or a portion of tool 1700 and the process described with reference to any one of FIGS. 17-23 may be used to rework composite winglet 2400 rather than manufacture composite winglet 2400 in FIG. 24.

Figure 24:
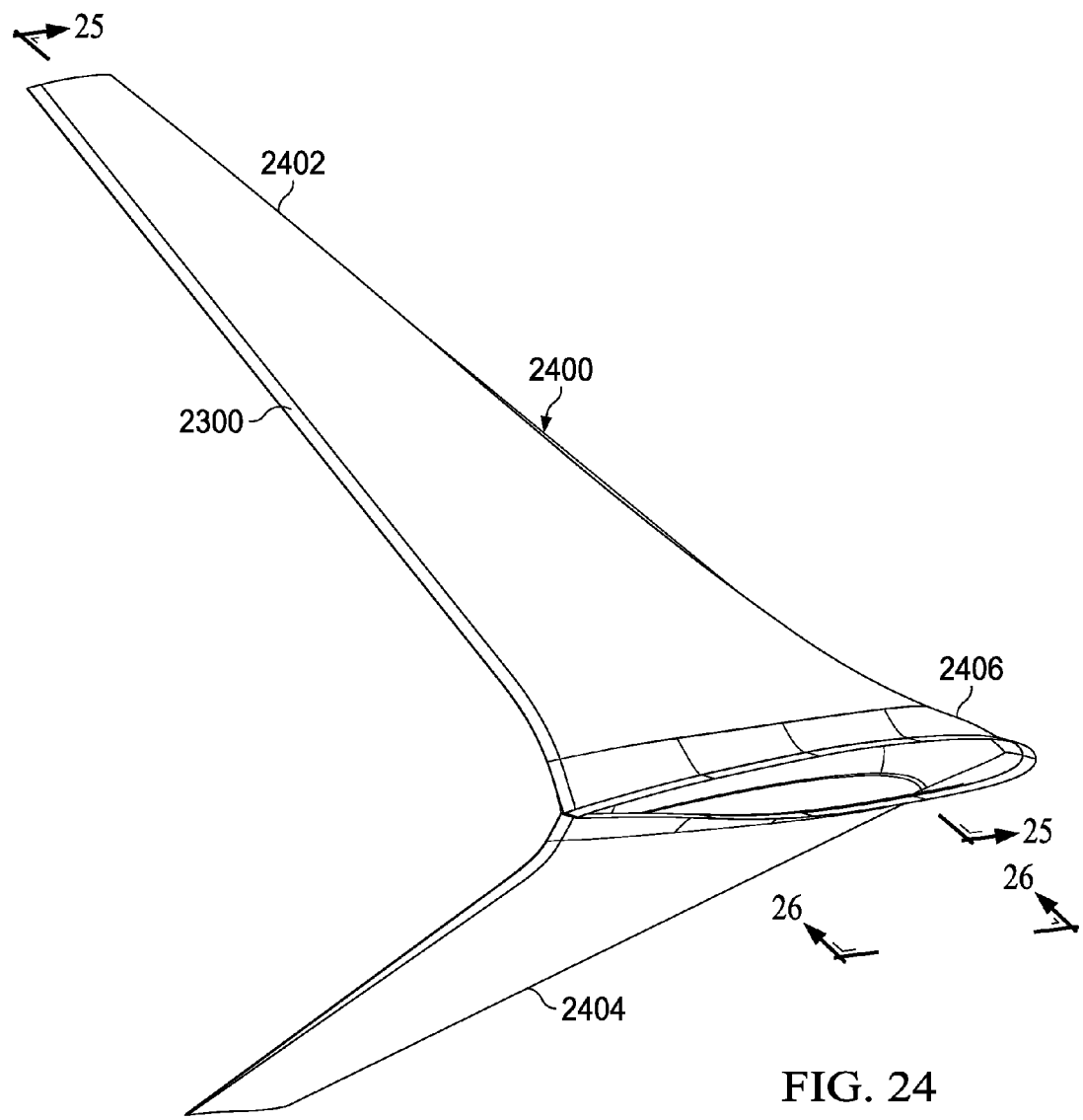
FIG. 24 is an illustration of a composite winglet with a lightning strip in accordance with an illustrative embodiment.

Turning now to FIG. 24, an illustration of a composite winglet with a lightning strip is depicted in accordance with an illustrative embodiment. In this depicted example, composite winglet 2400 with lightning strip 2300 is formed using the process described with reference to FIGS. 17-23.

As illustrated, composite winglet 2400 includes upper blade 2402, lower blade 2404, and root region 2406. Number of spacers 1900 and spacer 1804 in FIG. 19 and FIG. 18, respectively, are still present within composite winglet 2400 at this time.

Figure 25:
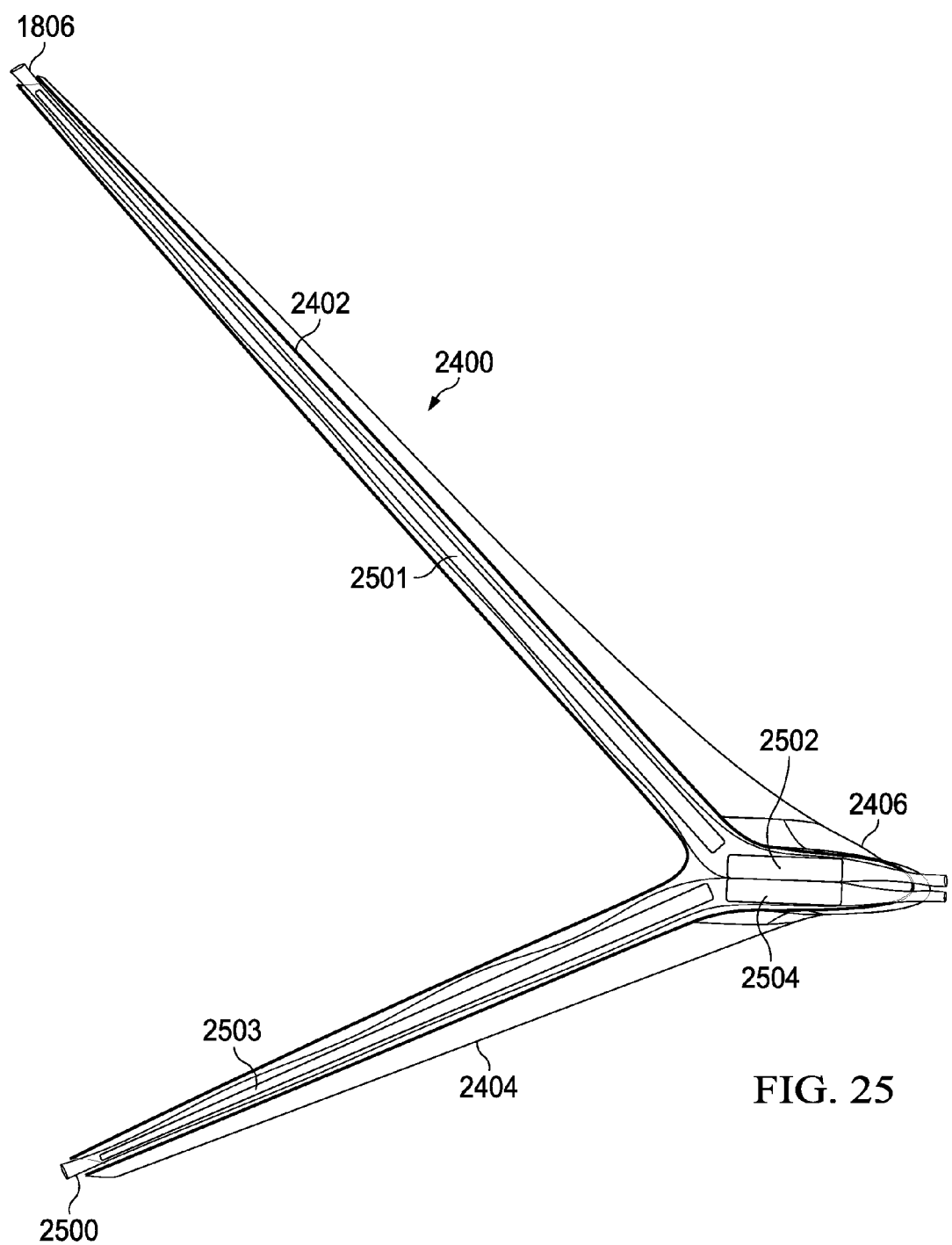
FIG. 25 is an illustration of a cross-sectional view of a composite winglet in accordance with an illustrative embodiment.

Referring to FIG. 25, a cross-sectional view of a composite winglet is depicted in accordance with an illustrative embodiment. In this depicted example, a cross-sectional view of composite winglet 2400 taken along lines 25-25 in FIG. 24 is shown.

As depicted, bag 1806 is seen in upper blade 2402 of composite winglet 2400, while bag 2500 is shown in lower blade 2404 of composite winglet 2400. Bag 2502 and bag 2504 form a channel in root region 2406 of composite winglet 2400.

In some illustrative examples, a number of additional spacers may be positioned within composite winglet 2400 to provide additional support or pressure during curing. For instance, caul plates may be positioned against the side surfaces of layup 1800 in FIGS. 18-22 to form straighter spars for composite winglet 2400.

In other examples, caul plates may be used to form straighter spars within root region 2406 of composite winglet 2400. These additional spacers may be removed with the bags after curing of composite winglet 2400.

Figure 26:
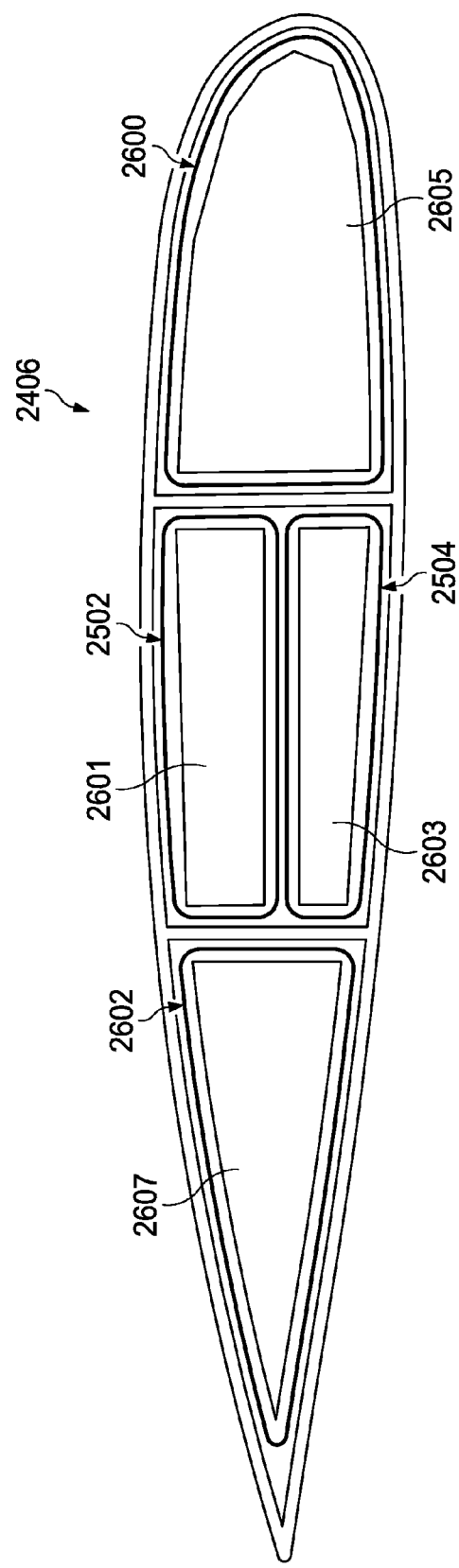
FIG. 26 is an illustration of a root region of a composite winglet in accordance with an illustrative embodiment.

In FIG. 26, an illustration of a cross-section of a root region of a composite winglet, during manufacture, is depicted in accordance with an illustrative embodiment. In this illustrative example, a more-detailed view of root region 2406 of composite winglet 2400 is seen in the direction of view lines 26-26 in FIG. 24.

As illustrated, bag 2502, bag 2504, bag 2600 and bag 2602 form channels in root region 2406 of composite winglet 2400. In particular, bag 2600 forms the leading edge of root region 2406, while bag 2602 forms trailing edge of root region 2406. Bag 2502 is shown around bag carrier 2601. Bag 2504 is shown around bag carrier 2603. Bag 2600 is shown around bag carrier 2605. Bag 2602 is shown around bag carrier 2607.

After curing of composite winglet 2400, all bags and other spacers may be removed from the gaps in composite winglet 2400. Composite winglet 2400 may then be trimmed. In other illustrative examples, composite winglet 2400 may be trimmed prior to removing the bags and other spacers.

Figure 27:
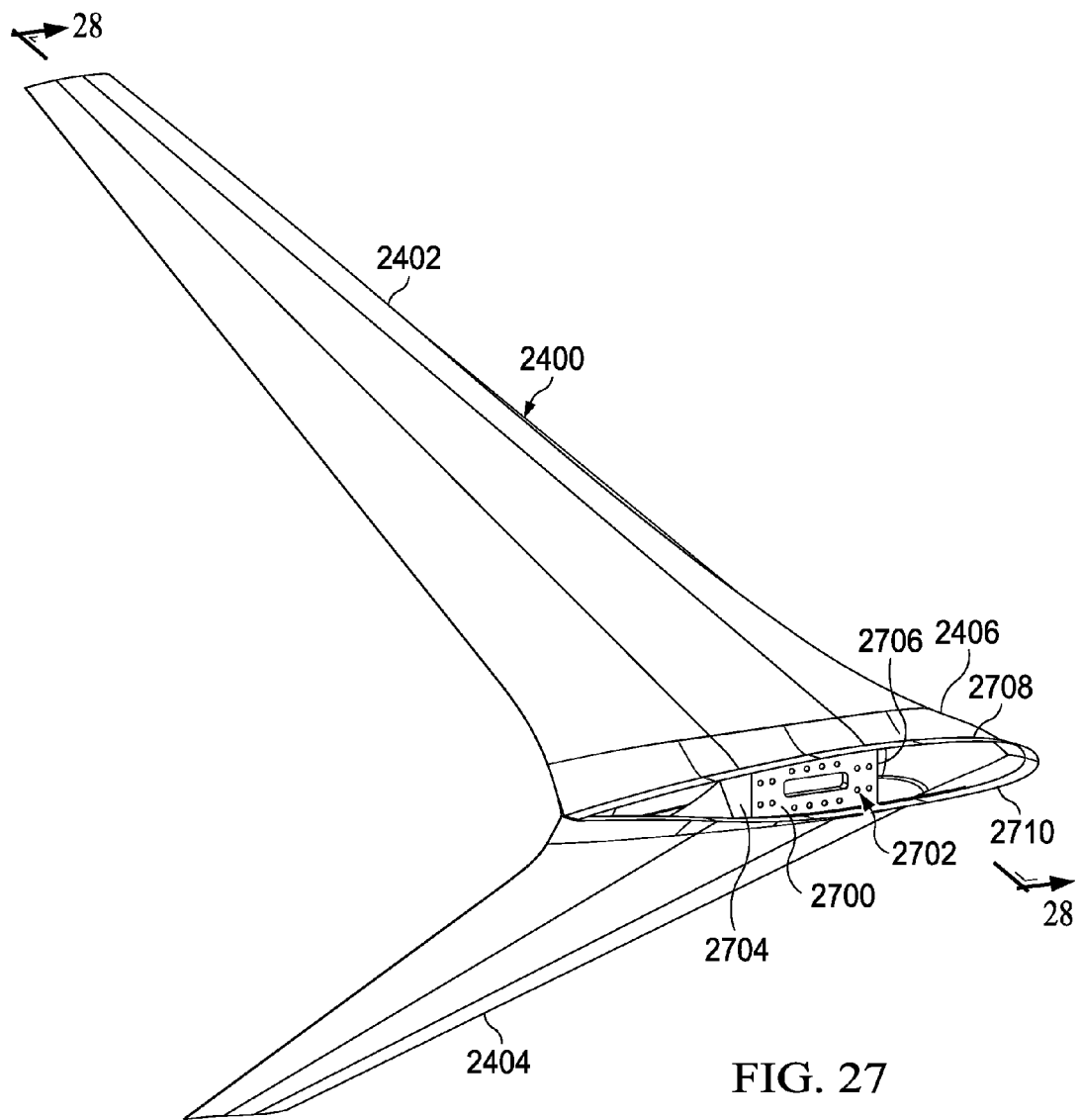
FIG. 27 is an illustration of a composite winglet with an attachment system installed within the composite winglet in accordance with an illustrative embodiment.

Turning now to FIG. 27, an illustration of a composite winglet with an attachment system installed within the composite winglet is depicted in accordance with an illustrative embodiment. In this illustrative example, attachment system 2700 has been installed within root region 2406 of composite winglet 2400.

As illustrated, number of fasteners 2702 is used to secure attachment system 2700 to root region 2406 of composite winglet 2400. In particular, number of fasteners 2702 may secure attachment system 2700 to at least one of support 2704, support 2706, upper surface 2708, or lower surface 2710 of root region 2406 of composite winglet 2400.

Figure 28:
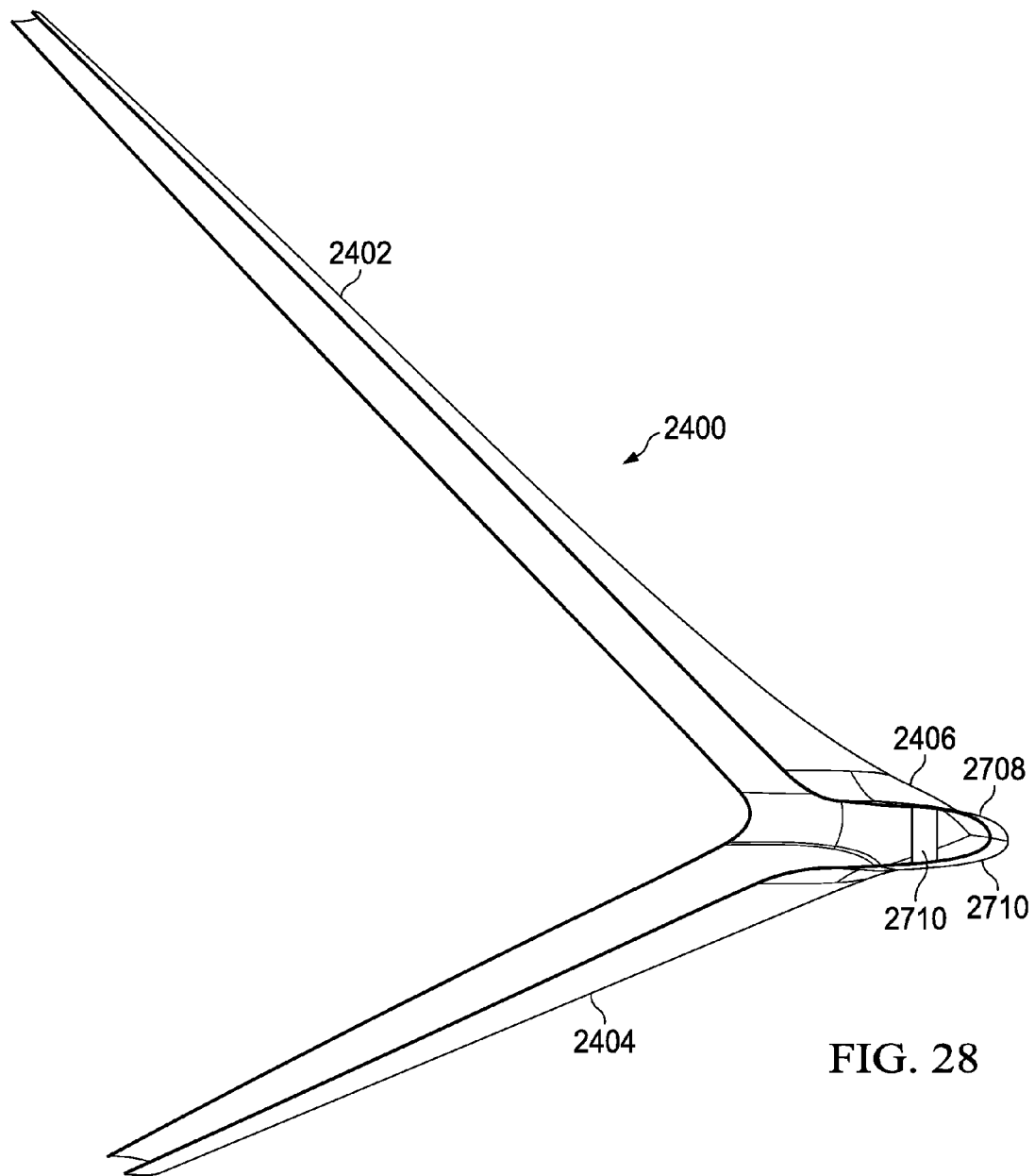
FIG. 28 is an illustration of a cross-sectional view of a composite winglet with an attachment system installed within the composite winglet in accordance with an illustrative embodiment.

Referring now to FIG. 28, an illustration of a cross-sectional view of a composite winglet with an attachment system installed within the composite winglet is depicted in accordance with an illustrative embodiment. In this depicted example, a cross-sectional view of composite winglet 2400 with attachment system 2700 taken along the lines 28-28 in FIG. 27 is shown.

As depicted, attachment system 2700 does not extend within upper blade 2402 or lower blade 2404 of composite winglet 2400. In this manner, upper blade 2402 and lower blade 2404 may be thinner than with some currently used winglets that need an attachment system that extends within the upper and lower blades of the winglet.

The different components shown in FIGS. 6-28 may be illustrative examples of how components shown in block form in FIGS. 2-5 can be implemented as physical structures. Additionally, some of the components in FIGS. 6-28 may be combined with components in FIGS. 2-5, used with components in FIGS. 2-5, or a combination of the two.

Figure 29:
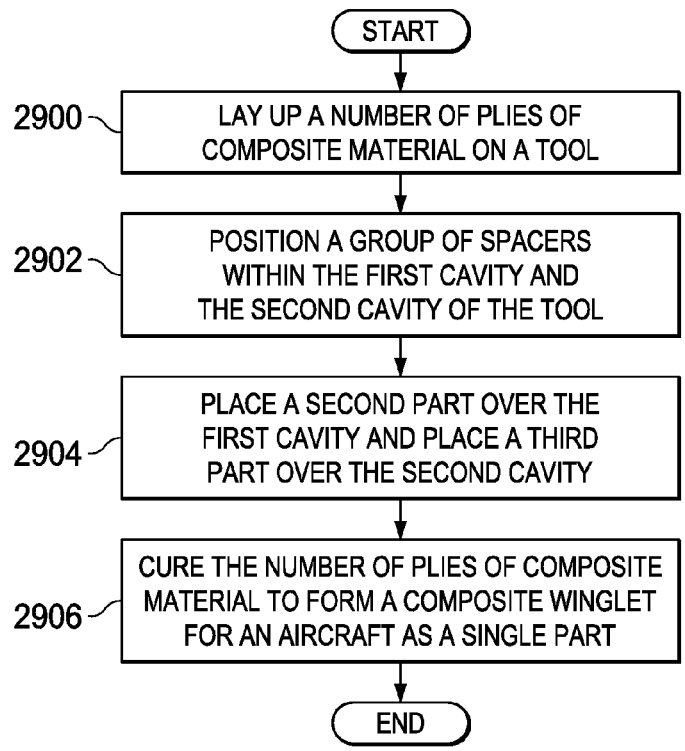
FIG. 29 is an illustration of a flowchart of a process for forming a composite winglet in accordance with an illustrative embodiment.

With reference now to FIG. 29, an illustration of a flowchart of a process for forming a composite winglet is depicted in accordance with an illustrative embodiment. The process illustrated in FIG. 29 may be implemented in aircraft manufacturing environment 200 in FIG. 2. One or more of the different operations may be implemented using one or more components in aircraft manufacturing environment 200 for aircraft 202 in FIG. 2.

The process begins by laying up a number of plies of composite material on a tool (operation 2900). In this illustrative example, the tool comprises a first part including and upper portion with a first cavity and a lower portion with a second cavity. The lower portion is positioned at an angle to the upper portion and connected to the upper portion at a transition region. The tool further comprises a second part configured to be placed over the first cavity of the upper portion and a third part configured to be placed over the second cavity of the lower portion.

Next, a group of spacers is positioned within the first cavity and the second cavity of the tool (operation 2902). The group of spacers is configured to form a number of chambers within the composite winglet.

Thereafter, a second part is placed over the first cavity and a third part is placed over the second cavity (operation 2904). Placing the second part over the first cavity and the third part over the second cavity seals the tool.

The number of plies of composite material is then cured to form a composite winglet for an aircraft as a single part (operation 2906), with the process terminating thereafter. During the curing process, a vacuum may be applied to the number of plies of composite material and the tool. The number of plies of composite material also may be heated to a desired temperature.

In other illustrative examples, curing may occur in a different manner. For instance, the number of plies of composite material may not be pre-impregnated with resin. In this case, resin may need to be infused into the number of plies of composite material prior to or during curing. In still other illustrative examples, the composite winglet may be formed using techniques such as a room temperature cure, resin transfer molding (RTM), or other suitable curing techniques.

In some illustrative examples, a number of radius fillers may be placed at a co-cured joint between at least one of the outboard skin or the inboard skin of the composite winglet or the spar. In still other illustrative examples, a lightning strip may be positioned within the tool prior to curing the number of plies of composite material such that the number of plies of composite material and the lightning strip are co-cured.

Figure 30:
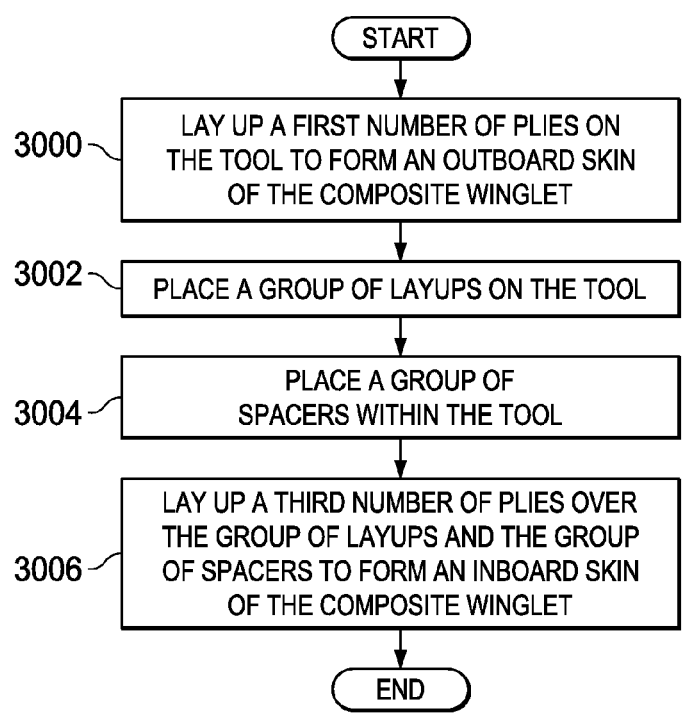
FIG. 30 is an illustration of a flowchart of a process for laying up a number of plies of composite material in accordance with an illustrative embodiment.

Turning next to FIG. 30, an illustration of a flowchart of a process for laying up a number of plies of composite material is depicted in accordance with an illustrative embodiment. The process described with reference to FIG. 30 may be implemented in operation 2900 in FIG. 29.

The process begins by laying up a first number of plies on the tool to form an outboard skin of the composite winglet (operation 3000). Next, a group of layups is placed on the tool (operation 3002). In this illustrative example, the group of layups includes a spacer covered with a second number of plies to form a spar.

Thereafter, a group of spacers is placed within the tool (operation 3004). The process then lays up a third number of plies over the group of layups and the group of spacers to form an inboard skin of the composite winglet (operation 3006), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 31:
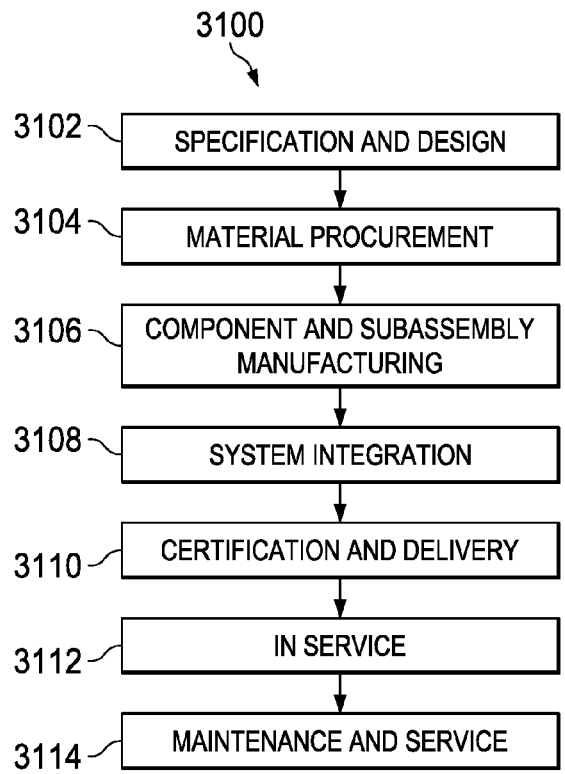
FIG. 31 is an illustration of a block diagram of an aircraft manufacturing and service method in accordance with an illustrative embodiment.
Figure 32:
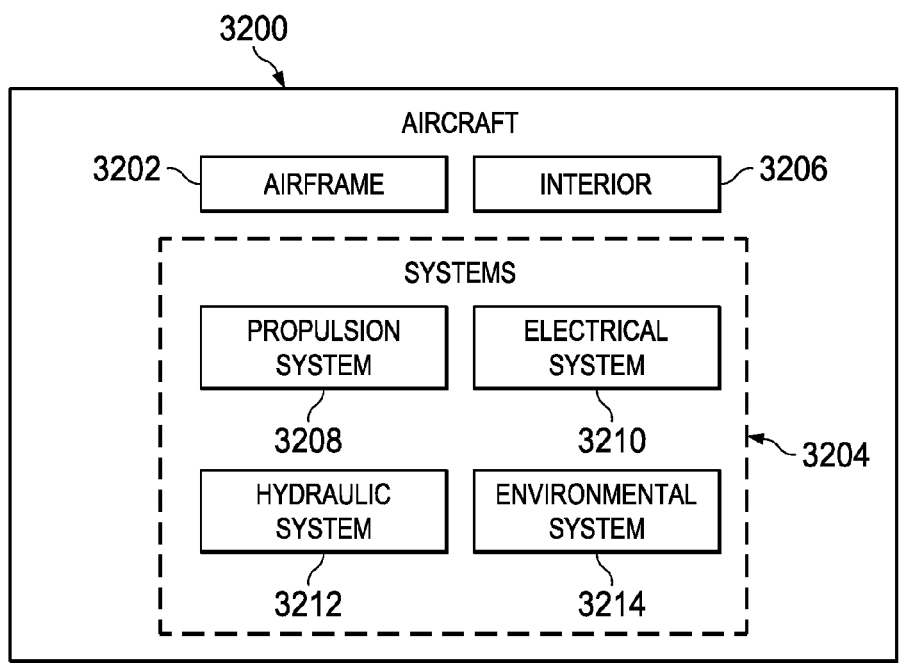
FIG. 32 is an illustration of a block diagram of an aircraft in accordance with an illustrative embodiment.

Illustrative embodiments of the disclosure may be described in the context of aircraft manufacturing and service method 3100 as shown in FIG. 31 and aircraft 3200 as shown in FIG. 32. Turning first to FIG. 31, an illustration of a block diagram of an aircraft manufacturing and service method is depicted in accordance with an illustrative embodiment. During pre-production, aircraft manufacturing and service method 3100 may include specification and design 3102 of aircraft 3200 in FIG. 32 and material procurement 3104.

During production, component and subassembly manufacturing 3106 and system integration 3108 of aircraft 3200 in FIG. 32 takes place. Thereafter, aircraft 3200 in FIG. 32 may go through certification and delivery 3110 in order to be placed in service 3112. While in service 3112 by a customer, aircraft 3200 in FIG. 32 is scheduled for routine maintenance and service 3114, which may include modification, reconfiguration, refurbishment, and other maintenance or service.

Each of the processes of aircraft manufacturing and service method 3100 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 32, an illustration of a block diagram of an aircraft is depicted in which an illustrative embodiment may be implemented. In this example, aircraft 3200 is produced by aircraft manufacturing and service method 3100 in FIG. 31 and may include airframe 3202 with plurality of systems 3204 and interior 3206. Examples of systems 3204 include one or more of propulsion system 3208, electrical system 3210, hydraulic system 3212, and environmental system 3214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3100 in FIG. 31. In one illustrative example, components or subassemblies produced in component and subassembly manufacturing 3106 in FIG. 31 may be fabricated or manufactured in a manner similar to components or subassemblies produced while aircraft 3200 is in service 3112 in FIG. 31. As yet another example, one or more apparatus embodiments, method embodiments, or a combination thereof may be utilized during production stages, such as component and subassembly manufacturing 3106 and system integration 3108 in FIG. 31. One or more apparatus embodiments, method embodiments, or a combination thereof may be utilized while aircraft 3200 is in service 3112 and/or during maintenance and service 3114 in FIG. 31. The use of a number of the different illustrative embodiments may substantially expedite the assembly of and/or reduce the cost of aircraft 3200.

In particular, composite winglet 208 from FIG. 2 may be formed and installed during any one of the stages of aircraft manufacturing and service method 3100. For example, without limitation, composite winglet 208 may be formed during subassembly manufacturing 3106. In other illustrative examples, composite winglet 208 may be installed during system integration 3108, routine maintenance and service 3114, or some other stage of aircraft manufacturing and service method 3100.

Thus, the illustrative embodiments provide a method, apparatus, and tool for forming a composite winglet for an aircraft. Composite winglet 208 comprises first blade 300, second blade 302, and root region 304. First blade 300 includes first leading edge 308 and first trailing edge 310. Second blade 302 includes second leading edge 314 and second trailing edge 316. Second blade 302 is positioned at an angle to first blade 300. Root region 304 is co-cured with first blade 300 and second blade 302 to form composite winglet 208. Root region 304 is configured to receive attachment system 214 for attaching composite winglet 208 to wing 212 of aircraft 202.

With the use of an illustrative embodiment, a composite winglet may be formed more quickly than using currently available systems. For instance, instead of manufacturing many parts and assembling them together, a composite winglet may be formed using a single tool to create a single composite piece. Forming the composite winglet in one piece decreases the time and cost of manufacturing and assembling winglets for aircraft. Additionally, forming the winglet with composite materials decreases the weight of the winglet for aircraft.

Further, with the use of an illustrative embodiment, a desired level of structural integrity may be achieved. For example, because fewer fasteners are used to attach the root region of the composite winglet to the wing of an aircraft, the composite material of the blades of the composite winglet maintain their strength. Moreover, the smooth surface of the blades results in increased aerodynamic performance as compared to some currently used systems.

In addition, composite winglets formed with the use of an illustrative embodiment may accommodate thinner blades than some currently manufactured winglets. For instance, because the attachment system for the composite winglet only extends within the root region of the composite winglet, as opposed to the blades, the blades of the winglet may be made thinner and more aerodynamic than before. As a result, fuel efficiency for the aircraft may be increased.

The illustrative embodiments also provide a novel implementation for forming composite structures and extracting spacers from these composite structures. For instance, materials selected for spacers used to form chambers within the composite structure are selected to be flexible and to be extracted from the composite structure without causing undesired inconsistencies in the composite structure. For instance, foam may be used for bag carriers within the composite winglet. These foam bag carriers may be easily extracted from the composite winglet without resulting in undesired inconsistencies that increase the manufacturing or maintenance time of the aircraft.

With the use of an illustrative embodiment, a complex geometry for a composite winglet may be formed. In particular, two blades joint at a root region having a smooth skin provides a desired level of aerodynamic performance, decreased weight, and ease of assembly on a wing of the aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A winglet for an aircraft, such that the winglet comprises one piece that comprises:
    a first blade that comprises:
        first plies that comprise a first composite material and form an outboard skin of the first blade;
        second plies that comprise:
            a second composite material and form an inboard skin of the first blade that extends upward, relative to a top surface of a wing of the aircraft; and
            the first plies co-cured to the second plies along both a non-metallic leading edge and a trailing edge of the first blade, such that, at an end, farthest from the top surface of the wing, of the first blade, an opening separates the non-metallic leading edge of the first blade from the trailing edge of the first blade;
    a second blade that comprises:
        third plies that comprise a third composite material and form an outboard skin of the second blade; and
        fourth plies that comprise a fourth composite material and form an inboard skin of the second blade that extends downward relative to a bottom surface of the wing of the aircraft, the third plies co-cured to the fourth plies along both a non-metallic leading edge and a trailing edge of the second blade; and
    a root region that comprises a channel that comprises composite plies that comprise a non-metallic first support and a non-metallic second support, each aligned substantially orthogonal to a chord line for the root region, the channel configured to receive an attachment system that comprises an extension between the first non-metallic support and the second non-metallic support and planar surfaces, connected substantially orthogonal to the extension, configured to connect to at least one of the supports within the root region, the attachment system configured to attach, at least via the extension, the winglet to the wing of the aircraft such that the root region comprises:
        the second plies and the fourth plies bonded together such that the non-metallic leading edge of the first blade and the non-metallic leading edge of the second blade form a co-cured continuous curved non-metallic leading edge of the root region and a trailing edge of the first blade and a trailing edge of the second blade form a co-cured continuous tapered trailing edge of the root region; and
        additional plies co-cured to the first plies and to the third plies to form an outboard portion of the root region such that the outboard skin of the first blade, the outboard portion of the root region, and the outboard skin of the second blade, comprise a single continuous surface.

2. The winglet of claim 1, wherein the first blade is an upper blade of the winglet and the second blade is a lower blade of the winglet, and the first composite material, the second composite material, the third composite material, and the fourth composite material each comprise an identical component.

3. The winglet of claim 1, further comprising:
the root region configured to receive the attachment system in the channel such that in operation the root region secures to the attachment system using at least one of: an adhesive, a weld, a bond, and a number of fasteners and
an interior of the first blade and an interior of the second blade each configured to preclude entry of the attachment system into an interior of at least one of: the first blade and the second blade.

4. The winglet of claim 1, wherein at least one: of the trailing edge of the first blade, and the trailing edge of the second blade, physically associate with a lightning strip.

5. The winglet of claim 4, further comprising the lightning strip co-cured into the winglet.

6. The winglet of claim 1, wherein the winglet comprises at least one of: a carbon fiber reinforced polymer, a fiberglass, an aramid fiber, and a nylon.

7. The winglet of claim 1, further comprising connections, between the root region and both the first blade and the second blade, that comprise continuous co-cured fastener-less bonds.

8. A manufacture that comprises a one-piece bifurcated winglet that comprises:
an upper blade, that inclines above a tip of a wing, and comprises:
first plies that comprise a first composite material and form an outboard skin of the upper blade; and
second plies that comprise a second composite material and form an inboard skin of the upper blade, the second plies co-cured to the first plies at both a non-metallic leading edge and a trailing edge of the upper blade;
a lower blade that declines below the tip of the wing, and comprises:
third plies that comprise a third composite material and form an outboard skin of the lower blade; and
fourth plies that comprise a fourth composite material and form an inboard skin of the lower blade, the third plies co-cured to the fourth plies at both a non-metallic leading edge and a trailing edge of the lower blade, such that, at an end, farthest from the tip of the wing, of the lower blade, an opening separates the non-metallic leading edge of the lower blade from the trailing edge of the lower blade;
a root region that comprises:
a top surface that comprises the second plies;
a bottom surface that comprises the fourth plies, the second plies bonded to the fourth plies, such that the non-metallic leading edge of the upper blade and the non-metallic leading edge of the lower blade form a co-cured continuous curved non-metallic leading edge of the root region and a trailing edge of the upper blade and a trailing edge of the lower blade form a co-cured continuous tapered trailing edge of the root region;
an outboard skin of the root region co-cured to the outboard skin of the upper blade and the outboard skin of the lower blade; and
a central channel that comprises a first support and a second support, each support comprised of non-metallic composite plies that align with an edge of a spar in the upper blade and an edge of a spar in the lower blade, such that the first support and the second support each stand substantially orthogonal to a chord line for the root region, configured to receive an attachment system, that comprises:
an extension between the first support and the second support; and
planar surfaces, connected substantially orthogonal to the extension, configured to connect to at least one of the supports within the root region.

9. The manufacture of claim 8, wherein the first composite material, the second composite material, the third composite material, and the fourth composite material each comprise a same material.

10. The manufacture of claim 8, wherein the root region further comprises fifth plies that comprise a fifth composite material that comprises an outboard skin of the root region bonded to the first plies and to the third plies.

11. The manufacture of claim 10, wherein the first composite material, the second composite material, the third composite material, the fourth composite material, and the fifth composite material each comprise a same composition.

12. The manufacture of claim 11, further comprising the composition comprising at least one of: a carbon fiber reinforced polymer, fiberglass, aramid fiber, and nylon.

13. The manufacture of claim 8, further comprising the central channel configured to attach to the tip of the wing via at least the extension of the attachment system connected within the central channel, without a direct connection to at least one of: the upper blade and the lower blade.

14. The manufacture of claim 8, wherein the upper blade comprises a longer length than the lower blade.

15. The manufacture of claim 8, further comprising connections, between the root region and both the upper blade and the lower blade, that comprise continuous co-cured fastener-less bonds.

16. A manufacture configured to attach to a tip of a wing of an aircraft, such that the manufacture comprises a one-piece winglet that comprises co-cured:
a first blade that comprises:
an outboard skin of the first blade that comprises first-plies; and
an inboard skin of the first blade that comprises second plies that extend upward relative to a top of the wing, such that a trailing edge of the first blade comprises a first lightning strip co-cured to the first plies and the second plies;
a second blade that comprises:
an outboard skin of the second blade that comprises third plies; and
an inboard skin of the second blade that comprises fourth plies that extend downward relative to a bottom of the wing, such that a trailing edge of the second blade comprises a second lightning strip co-cured to the third plies and the fourth plies; and
a length the second blade positioned at an angle to a length of the first blade; and
a root region configured to receive an attachment system configured to attach the one-piece winglet to the wing of the aircraft, such that the root region comprises:

the second plies and the fourth plies bonded together such that a non-metallic leading edge of the first blade and a non-metallic leading edge of the second blade form a co-cured continuous curved non-metallic leading edge of the root region and a trailing edge of the first blade and a trailing edge of the second blade form a co-cured continuous tapered trailing edge of the root region;

a channel that comprises non-metallic supports that align with a first spar in the first blade and a second spar in the second blade, the channel configured:

to secure the root region to the attachment system via at least one of: an adhesive, a weld, a bond, and a number of fasteners; and such that a first support and a second support, among the non-metallic supports, each stand substantially orthogonal to a chord of the root region and configured to receive an extension member of the attachment system between the first support and the second support such that the attachment system comprises the extension member between planar surfaces connected substantially orthogonal to the extension member, the planar surfaces configured to connect to at least one of: the first support and the second support without a direct connection into at least one of: an interior of the first blade and an interior of the second blade; and fifth plies that comprise an outboard skin of the root region, the outboard skin of the root region co-cured to the first plies and the third plies, such that all plies comprise at least one of: a carbon fiber reinforced polymer, a fiberglass, an aramid fiber, and a nylon.

17. The manufacture of claim 16, wherein the first blade comprises an upper blade and the second blade comprises a lower blade.

18. The manufacture of claim 16, wherein the first blade comprises a greater length than the second blade.

19. The manufacture of claim 16, further comprising a third lightning strip co-cured to the tapered trailing edge of the root region.

20. The manufacture of claim 16, further comprising connections, between the root region and both the first blade and the second blade, that comprise continuous co-cured fastener-less bonds.

* * * * *

UNITED STATES PATENT AND TRADEMARK OFFICE
CERTIFICATE OF CORRECTION

PATENT NO.        : 9,738,375 B2
APPLICATION NO.   : 14/097413
DATED             : August 22, 2017
INVENTOR(S)       : Witte et al.

Page 1 of 1

It is certified that error appears in the above-identified patent and that said Letters Patent is hereby corrected as shown below:

In the Claims

Column 21, Line 15, change "fasteners and" to read --fasteners; and--
Column 22, Line 51, correct "upward relative" to read --upward, relative--
Column 22, Line 59, correct "downward relative" to read --downward, relative--
Column 22, Line 63, change "a length the" to read --a length of the--
Column 24, Line 4, correct "first blade and" to read --first blade, and--

Signed and Sealed this
Sixteenth Day of October, 2018

Andrei Iancu
*Director of the United States Patent and Trademark Office*